United States Patent [19]
Lovoi

[11] Patent Number: 4,907,169
[45] Date of Patent: Mar. 6, 1990

[54] ADAPTIVE TRACKING VISION AND GUIDANCE SYSTEM

[75] Inventor: Paul A. Lovoi, Saratoga, Calif.

[73] Assignee: International Technical Associates, Santa Clara, Calif.

[21] Appl. No.: 103,441

[22] Filed: Sep. 30, 1987

[51] Int. Cl.[4] .......................... G06F 15/46; B23K 9/12
[52] U.S. Cl. ............................... 364/513; 219/124.34; 318/568.16; 318/568.21; 318/577; 358/101; 901/42; 901/47
[58] Field of Search ........................ 364/513, 191–193, 364/559, 478, 167; 318/577, 568, 568.16, 568.21; 358/101, 107; 901/42, 46, 47; 382/1, 8, 19, 48, 50, 51; 219/124.34; 414/730

[56] References Cited

U.S. PATENT DOCUMENTS

| | | | |
|---|---|---|---|
| 4,380,696 | 4/1983 | Masaki ............................ | 318/568 X |
| 4,568,816 | 2/1986 | Casler, Jr. ....................... | 901/47 X |
| 4,611,292 | 9/1986 | Ninomiya et al. .............. | 364/513 X |
| 4,715,772 | 12/1987 | Kanayama ..................... | 364/513 X |
| 4,727,471 | 2/1988 | Driels .............................. | 364/167 |
| 4,744,039 | 5/1988 | Suzuki et al. .................. | 364/513 |
| 4,761,596 | 8/1988 | Nio et al. ......................... | 901/47 X |

*Primary Examiner*—Joseph Ruggiero
*Attorney, Agent, or Firm*—Thomas M. Freiburger

[57] ABSTRACT

An adaptive tracking vision and guidance system for use with robot systems includes a structured light vision system and an expert system based look ahead feature tracker. The adaptive tracking vision system may be used to track a feature on which the robot is to operate and to supply guidance information in real time to the robot or to an adaptive stage on the robot arm train. The vision system may be a structured light system capable of scanning a relatively large window, and a control computer. The feature tracker includes an expert system software package and interface packages for the robot controller, host computer, vision camera and operator console. The vision system does an initial search to locate a feature based on a priori knowledge of characteristics of the feature. Then the system tracks the feature by scanning ahead, adaptively planning future scans, predicting the feature path and choosing the data to be used to reduce processing time. The system can supply guidance information to an adaptive stage controlling an end effector tool so that the robot can perform the desired operation precisely on the feature. If the feature is lost while scanning ahead, the vision system does a recovery search to relocate the feature, including switching to alternative mapping systems if necessary. If the feature cannot be recovered a signal is given to the operator.

44 Claims, 17 Drawing Sheets

3-D VISION SYSTEM COMPONENTS AND ORGANIZATION

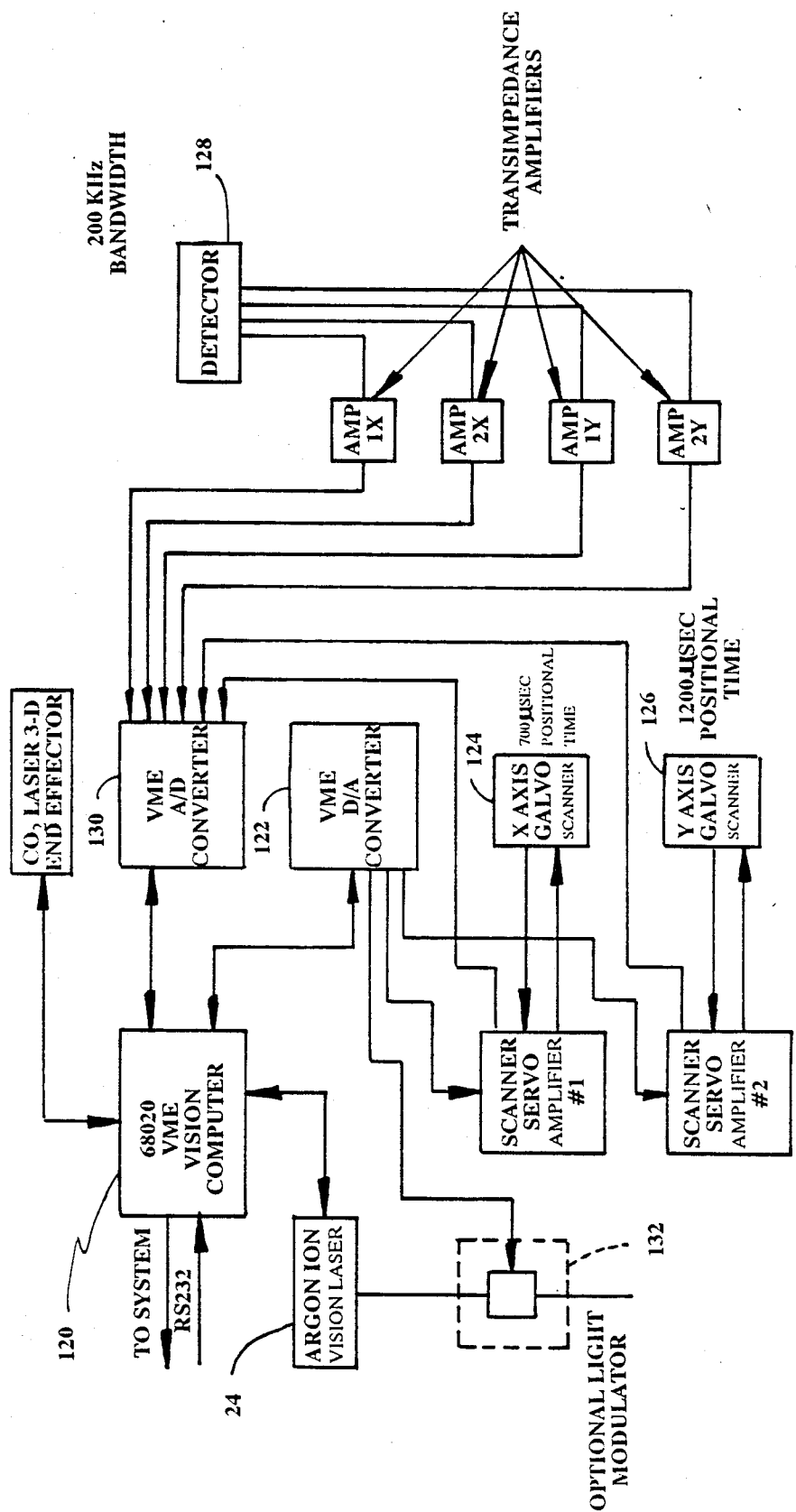
FIGURE 16    VISION SYSTEM

FLOW CHART - SEARCH, TRACK & RECOVERY

INITIAL SEARCH

TRACK

FIGURE 20 RECOVERY SEARCH

EXPERT SYSTEM ARCHITECTURE

ADAPTIVE TRACKING VISION AND GUIDANCE SYSTEM

GOVERNMENT RIGHTS

The Federal Government has rights in this invention pursuant to Contract No. N00014-82-C-2396 awarded by the United States Navy.

BACKGROUND OF THE INVENTION

The invention relates to machine vision systems, and particularly to an adaptive vision and guidance system for use in conjunction with robot systems.

Robots may be used in many applications to perform operations on a workpiece. For example a laser beam may be directed by a robot to perform various operations including welding, cutting, and milling. Many other operations such as conventional welding, water jet cutting, or bead blasting can also be performed by robots.

The guidance of a particular operation or function by a robot is made difficult by the fact that many robotic applications such as laser welding require very high accuracy, typically the order of plus or minus 5 to 7 mils (0.005 to 0.007 inch). Also, for many applications the path on which the operation is to be performed is not a straight line but may follow curves and complex patterns and abrupt changes of direction or width, in three dimensions. Errors are introduced not only by the robot itself but also by workpiece handling and positioning apparatus.

In many potential applications, therefore, the robotic systems are simply unable to track the desired path accurately enough over the entire path to perform the desired operation with an acceptable degree of quality.

To obtain an acceptable degree of quality, the position of the feature, orientation of the workpiece, and the path of the particular machine operation could be verified manually over the extent of the feature prior to the actual operation. However, manual verification eliminates many of the advantages provided by automation. Further, the error of robots over a large path is considerable, so that repeatability of the path of the end effector over the entire path, to the degree of accuracy normally required in welding operations, for example, is not possible. Accuracy, repeatability and predictability of robots can be very good over very short distances or times, e.g. the robot position one inch or one second from now relative to its present position. But this is not true over relatively great distances/times.

There have been many examples of pre-programmed automated welding without feedback, such as those used in automobile manufacturing. Such robotic applications are limited in achievable precision over long paths and require fairly precise locating. Also, features to be operated on can vary from one workpiece to the next, without ability of the robotic system to adapt. Poor quality products can result.

The ability of a robotic system to adapt to variations from one workpiece to the next is particularly important where the workpieces are used parts which require rework or repair. Where a robotic system is assembling or performing operations on new parts, the variations between the parts can be controlled or at least known to be within a certain range. On the other hand, where the robotic system must perform repair work, the required repair may change greatly from one workpiece to the next.

One solution to the problem of robot accuracy is to provide the robot with a guidance system which feeds position information back to the central robot control. This helps guide the robot in real time (or "pseudo real time"), with guidance based on inputs from sensors operating at normal robot process speeds. General Electric Company's MIG/TRAK system is an example of this type of robot guidance. The system employs feedback to a central robot to guide the robot along a seam. However, the speed at which a desired complex operation can be performed is severely limited due to the time required for the robot to respond to feedback information. The mass of the robot's components is one problem preventing acceptably fast acceleration and movement to respond fast enough for practical use in complex-movement operations. Also, such systems cannot relocate a seam or feature once it is lost. As a result, any time a feature is lost, operator intervention is required.

In many intricate welding operations such as those required in repair of aerospace components, prior to the present invention hand welding was the only practical procedure to achieve acceptable results. On original manufacture some automation has been possible with pre-programmed robotics, due to predictability of seam patterns, but systems for accomplishing welding of a complexly patterned crack or repair seam, for example in a jet engine casing, were not available. Some systems have employed vision systems for simple seam tracking, continuing until the seam or feature is lost. These systems had application in original production applications on simple parts, but have not been practically adaptable to more complex aerospace components.

Previous vision systems may be categorized as gray scale video or structured light systems. Gray scale systems obtain and process gray scale light/dark contrast information. Structured light systems use 3-D or topology information to detect a particular feature.

In structured light an external light source is used-typically a laser beam. The laser beam is impinged on the workpiece surface at one angle, and viewed with a camera from another angle. This gives a topology or resolution of the surface by the triangulation effect. With an appropriate detector, and with proper calibration, the surface topology can be determined electrically. In typical application of either type of system, a feature path is usually found by collecting data from the entire surface of the workpiece and then analyzing the data to detect the feature. Due to amount of data which must be processed with such a mode of operation, such prior vision systems have found limited practical use, at least in the application contexts of the present invention described below.

SUMMARY OF THE INVENTION

In accordance with the present invention, an automated system for mapping or performing an operation on a feature has the capability to track the feature in "real time." The adaptive vision and tracking system of the invention typically comprises a component mounted on a platform or arm of a robotic system. The platform or arm's movement is under the central control of the robotic system, and the vision and tracking system move along with the platform on a preprogramed path. However, the vision and tracking system will track a feature as it varies from the preprogrammed robotic path and will determine corrections of the feature from that path.

The data taken as the feature is tracked can be stored for later correction of the centrally-controlled robotic movements in a subsequent pass; they can be used in "real time" to feed back to the central robot to adjust the robotic path as it progresses; or they can be used in "real time" to control an adaptive stage a short distance (or time) behind the vision system, also mounted on the robotic platform. In the latter case, which is a principal aspect of the invention, the adaptive stage ordinarily carries a tool which is manipulable in three dimensions in response to feedback from the vision system and a computer which constantly is determining positions. The adaptive stage is directed precisely to remain on the feature as it progresses along the feature, even though the platform is moving in a somewhat different path.

The adaptive vision/tracking system of the invention is comprised of two distinct components, a vision system and an expert system based look ahead feature tracker. The vision system comprises a low power laser, a high-speed flexible laser beam scanner, a high-resolution camera, and a control computer. Several different types of information may be gathered by the vision system including 3-D, topology, and gray scale information.

The feature tracker comprises an expert system software package and interface packages for the computer and vision camera. The computer communicates with a central robot controller.

The tracking vision system is adaptive in several respects. It can distribute its processing power where it is needed. This is accomplished in part by predicting where the tracked feature will appear during a succeeding scan and only scanning a small predictive window in that scan. If the feature is not detected, another scan mode can be tried. The scanning beam can be directed anywhere within the field of view of the camera and the camera only processes data as required by the vision system controller (computer). The scan can be modified to different patterns, to approximate a circle for example, to help detect the feature. Scans with lower resolution over part of the path and higher resolution (more data points) over other parts are also possible in order to minimize the processing time required to identify the particular feature being tracked. Also the vision system is adaptive in that it can choose which type of data is to be used to track the feature, 3-D or gray scale data, for example, and it can change from one to the other if the feature cannot be found using one mode.

The feature tracker utilizes the high local predictability of robots in conjunction with the directable vision system to scan ahead of the robot operation point, when the system includes an adaptive stage with end effector or tool. The map ahead operation of the feature tracker allows a local predictive path to be transferred to the adaptive stage (end effector controller) while the vision system is acquiring additional tracking information. This method of tracking provides a time buffer that allows corrective action to be taken when the tracked feature is lost.

For example, if a one inch per second laser welding process is being carried out on a lap joint and a one inch map ahead is in effect, the system has a one second time buffer.

In this buffer time, if the feature is lost the vision system can adaptively try different scan strategies and if still unsuccessful, the system can go from structured light to gray scale analysis of the data taken. If still unsuccessful, the system can go to topology mapping, e.g. seeking to find an intersection line of two planes slightly out of alignment which may represent a seam. The expert system is utilized to optimize the use of the vision system in the available time. Should the feature or joint be lost, say due to a hole in the exit path of the joint, then the expert system might rescan the known location, go to full width scans, scan ahead in a binary search, or scan in a circular pattern to try to relocate the feature. If the feature is relocated then it can be tracked back to where it was lost and decisions made with what to do with the untrackable region, if any. In this manner most lost-of-track conditions can be corrected and where no recovery is possible the operator is given information about the attempted recovery so as to have a clear understanding of the problem.

The system is adaptive also in the sense that it can "learn" from recovery searches and from failure in such searches. The expert system stores knowledge relative to the search and recovery, and from operator input if necessary, so that it will more quickly recognize the same situation when it occurs again. The expert system actually adds or deletes rules which define the expert knowledge and changes the order in which the rules are examined.

The expert system operates in three distinct modes: initial search, track, and recovery search. In the initial search mode the system looks for the requested feature, the system having a priori knowledge of the particular feature. (The type of feature can be input by the operator, with the system "remembering" the characteristics of such a feature as seen by the vision system.) The system uses various search techniques depending upon the requested feature, the elapsed time, and the information processed up to that time in the search.

Once the feature has been identified, the track mode is initiated. In this mode the controller predicts the next position of the feature and plans a minimum data acquisition sequence. The data acquisition sequence planning considers the previous sequence, where the feature was located compared to the previous acquisition sequences, and trends in previous data sets, such as narrowing crack width or reduction in signal-to-noise ratios. If the feature is detected within the sequence, then the tracking process continues. If the feature is not detected, then the third mode is initiated: recovery search mode. The recovery search mode determines which scanning pattern to use, which type of data to use, and the order in which data is to be collected in order to relocate the feature in the available time. All of this is accomplished with the expert system software.

As outlined above, the adaptive vision system may be used with an adaptive stage or low mass end effector on the end of a robot arm train. In this application the vision system is mounted on the robot arm or robot platform and the robot arm train moves along a pre-taught path which is close enough to the feature's actual path to keep the feature being tracked in the field of view of the vision system and within reach of the adaptive stage. The adaptive vision system provides guidance in real time (or "pseudo real time") to the adaptive stage, which can manipulate the point of operation of the tool to stay on the feature as the robot platform moves.

In another mode, as mentioned above, the adaptive vision system in an initial survey may provide guidance information to the central robot controller itself. In this mode of operation, self-taught the path of the robot arm is taught (in "real time") while the vision system tracks the feature in an initial pass, slower than normal process speed. This gives the robot manipulation system and arm train more time to react to vision system feedback.

In a second pass, the adaptive vision system may operate to guide the adaptive stage operation point just as if the path of the robot arm was preset by some other previously input means.

A broad object of the present invention is to provide an adaptive vision and tracking system which may be used with a robot to track a feature on a workpiece which may follow an intricate path.

A related object of the invention is to provide an adaptive vision/tracking system for guiding an adaptive stage on a robot arm train in "real time" so that the adaptive stage can manipulate the operation point of the robot to accurately follow a desired feature path.

These and other objects, advantages, and features of the invention will be apparent from the following description of preferred embodiments, considered along with the accompanying drawings.

DESCRIPTION OF THE DRAWINGS

FIG. 8 shows two different positions of the platform, which carries the adaptive vision system and the adaptive stage with the work tool. In the second position, the adaptive stage is performing its operation (such as a seam weld) on the feature at a point which was located by the vision system in the first illustrated position.

FIG. 16 is a system block diagram showing vision system architecture.

DESCRIPTION OF PREFERRED EMBODIMENTS

Figure 1A:
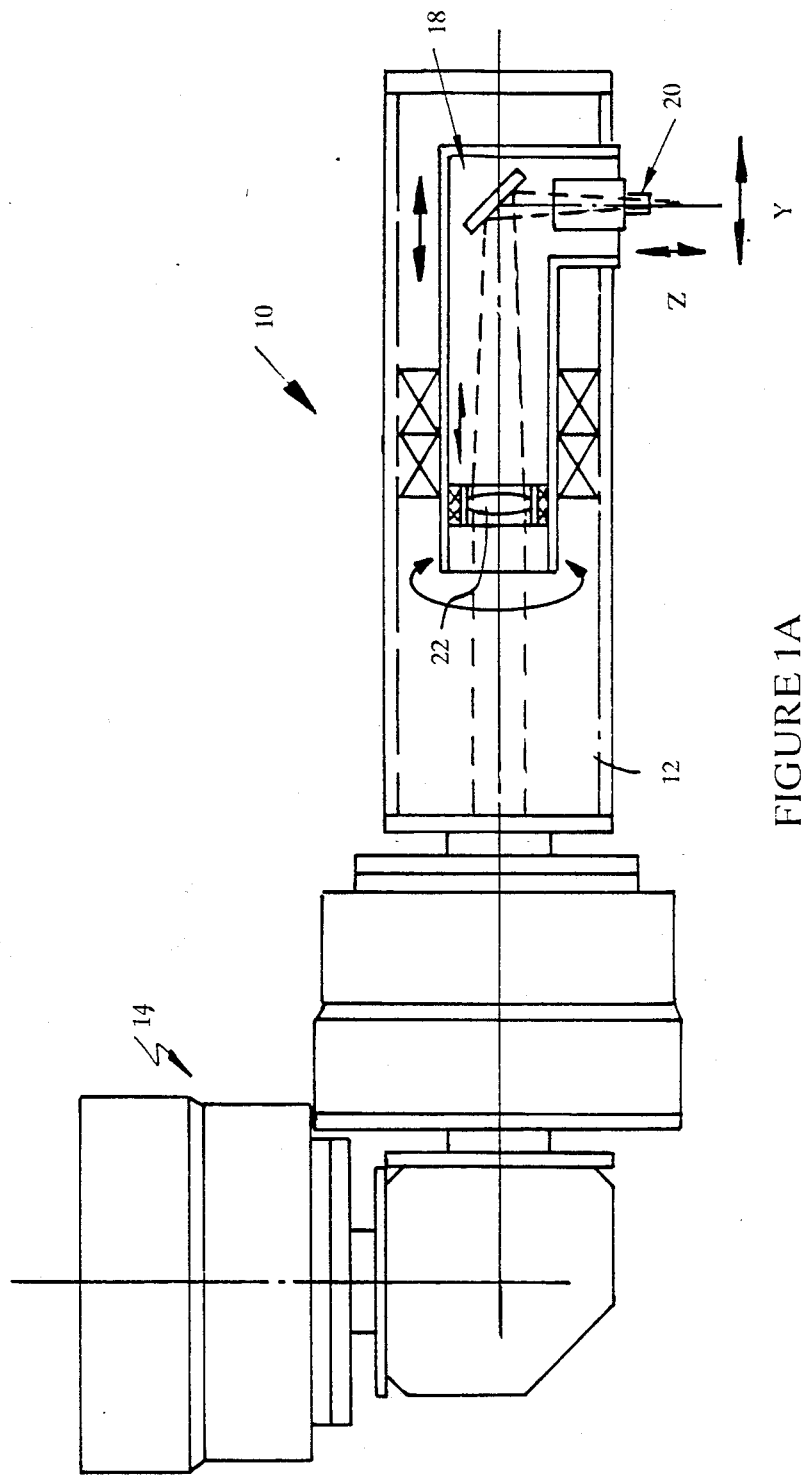
FIG. 1A is an elevational schematic view showing one embodiment of an adaptive stage, adaptive vision/tracking system of the present invention, as it may be incorporated in a robotic welding system.
Figure 1B:
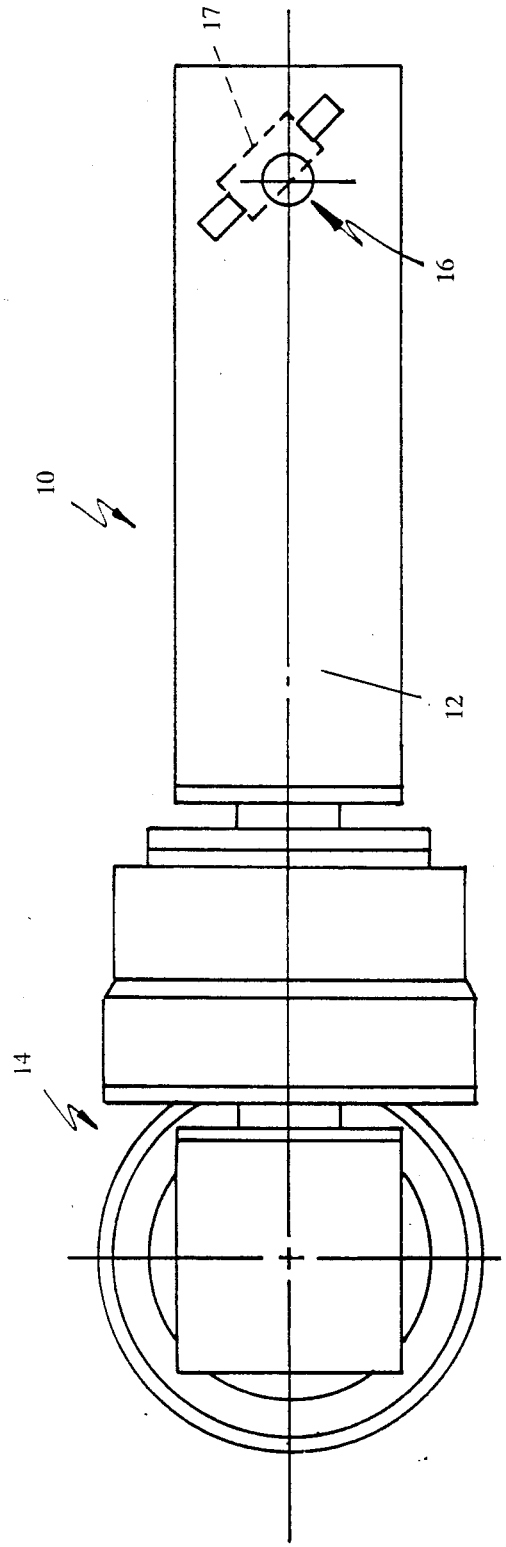
FIG. 1B is a plan view of the components shown in FIG. 1A, showing vision system placement.

In the drawings, FIGS. 1A and 1B show a robotic component assembly generally identified by the reference number 10, on a platform or arm 12 at the end of a robot arm train, a portion of which is generally indicated at 14. In this embodiment the platform 12 is shown as a cylinder with respect to which the adaptive stage 10 moves.

The assembly 10 includes a vision system, a portion of which is generally identified as 16 and an adaptive stage or function providing component generally indicated at 18. The adaptive stage comprises an end effector with a tool 20 which performs a desired function on a workpiece, such as a laser cutting or welding operation, conventional welding, water jet cutting, bead blasting, ultrasonic welding, etc.

As indicated in FIG. 1A, the adaptive stage 18 is afforded full movement to reach any point within an envelope of space near the platform 12 of the robotic system. The adaptive stage controls the working point of the end effector by translational movement and movement about several translational or rotational axes, as indicted by arrows in FIG. 1A. If the end effector tool directs a laser beam at a workpiece, variation in the distance at which the laser beam acts can be accomplished through the use of a focusing lens 22 which is subject to translation along the beam path, to lengthen or shorten the distance of focus from the end effector tool 20. The adaptive stage can include provision for straight translation in all three axes, and if needed, rotation about any of these axes to control the pointing angle of the end effector tool with respect to the platform 12. In the case of a laser beam used for welding, and depending on the effective reach needed for the adaptive stage, such X-Z translation and Y rotation are used. In any event, these movements and rotations which control the working point of the tool 20 are accomplished by servo or stepping motors (not shown) incorporated in the adaptive stage and controlled by a controlling computer discussed below.

FIG. 1B shows in plan view the "footprint" 17 of the vision system 16 over the work.

Figure 2:
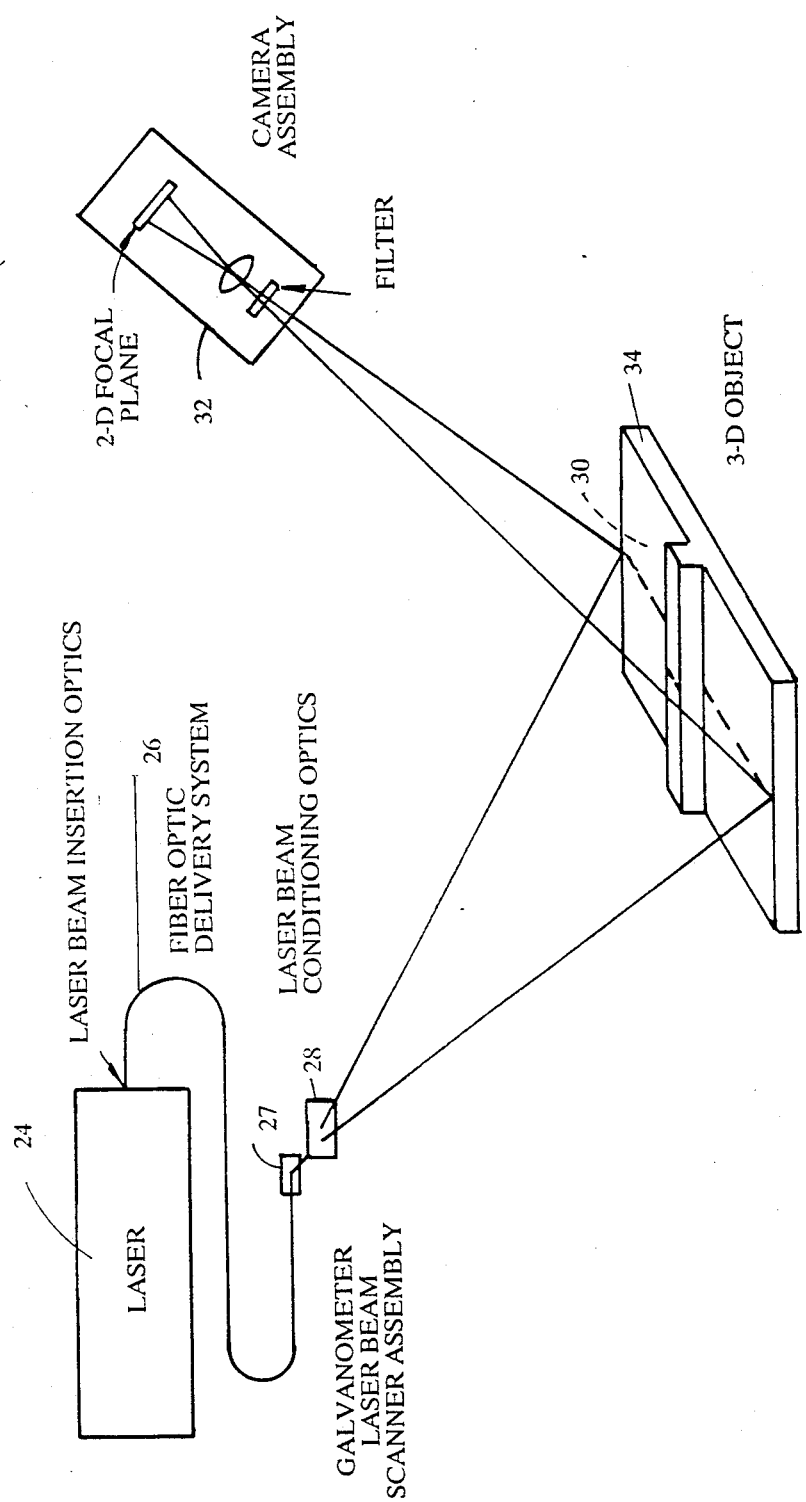
FIG. 2 is a partial schematic drawing showing the vision subsystem of the adaptive tracking vision and guidance system.

FIG. 2 shows schematically and partially in perspective some of the components and manner of operation of the vision system 16. A low power laser 24, which may be an argon ion laser, delivers a beam through a fiber optic delivery system 26. The beam is conditioned by beam conditioning optics 27 so that it may form a small spot size and is scanned by a galvanometer beam scanner assembly 28, over a selected scanning path 30 and at selected data point density under control of the computer of the adaptive vision system.

A camera assembly 32 is oriented to have the scan path or scan line 30 (not necessarily a straight line) in its field of view, and as the laser beam scans the scan path 30 across a three-dimensional object or workpiece 34, the camera records data as to where the scattered laser beam is seen in the camera's field of view. This data is sent to the vision system computer, as further explained below, for analysis in accordance with structured light 3-D mapping, gray scale mapping or the techniques. The position at which a data point or scattered laser spot is seen in the camera's field of view will indicate its position in three-dimensional space, as is well known in the field of 3-D mapping. The 3-D vision system may comprise, for example, a system marketed by Technical Arts, Inc. under the Model Number 100X.

Figure 3:
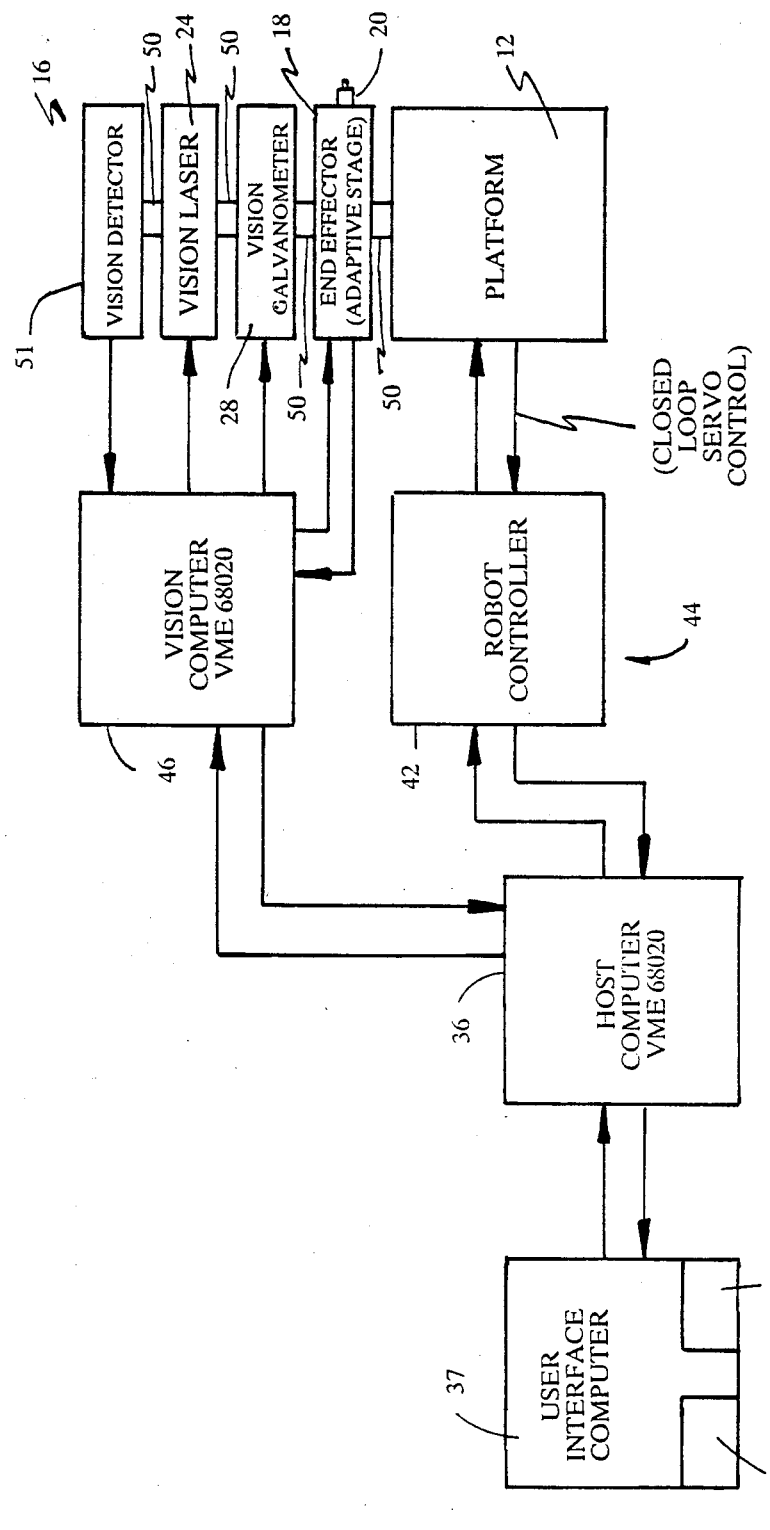
FIG. 3 is a block diagram illustrating the entire robotic system of the present invention, including the adaptive vision/tracking system and with an adaptive stage directing a tool for performing a work function.

FIG. 3 shows generally the overall robotics system of the invention, within which the platform 12, end effector tool 20, adaptive stage 18 and vision system 16 are incorporated. Lines of control and feedback are indicated in FIG. 3

As FIG. 3 illustrates, three computers may be included in the system of the invention. A first computer 37 is at the user end of the system and may comprise an IBM AT computer, with user interface including a connected keyboard 38 and display 40. The computer 37 serves as a user interface with a second computer 36 which comprises the central control for the overall robotic system 44. The term "robot central control" as used herein refers collectively to the host computer 36 and a robot controller 42 which itself has a computer.

The host computer 36 communicates with a third computer 46, which again may have a VME 68020 processor. This computer 46 is the adaptive stage computer/controller, for controlling the operation of the vision system, for receiving location data from the vision system, for receiving platform position information from the central controller computer 42, and for sending control commands to the adaptive stage 18 to direct the end effector to move the tool 20 to act at the correct point at a particular time or position along a feature on which an operation is being conducted.

As illustrated in FIG. 3, the main or central computer controls the robot system mechanism including the platform 12. The central computer also communicates in both directions with both the operator or host computer 36 and the vision/adaptive stage controller computer 46.

The robot system mechanism controls the position of the platform or arm 12, which in FIG. 3 is shown mechanically connected to the adaptive stage 18 and vision components (mechanical connection 50 indicated) which will move the end effector tool 20 relative to the platform, depending on commands received from the computer 46. The computer 46 also sends commands to the vision system 16, which is fixed to the robotic platform 12, directing the vision system as to density of data to be taken, width of scan, where to scan, type of scan, etc. The vision system 16 via a detector 51 sends data to the computer 46 as to the location of a feature, failure to find a feature in a scan, etc. so that the computer can adaptively control the vision system in response, and so that it can control the adaptive stage accordingly.

Figure 4:
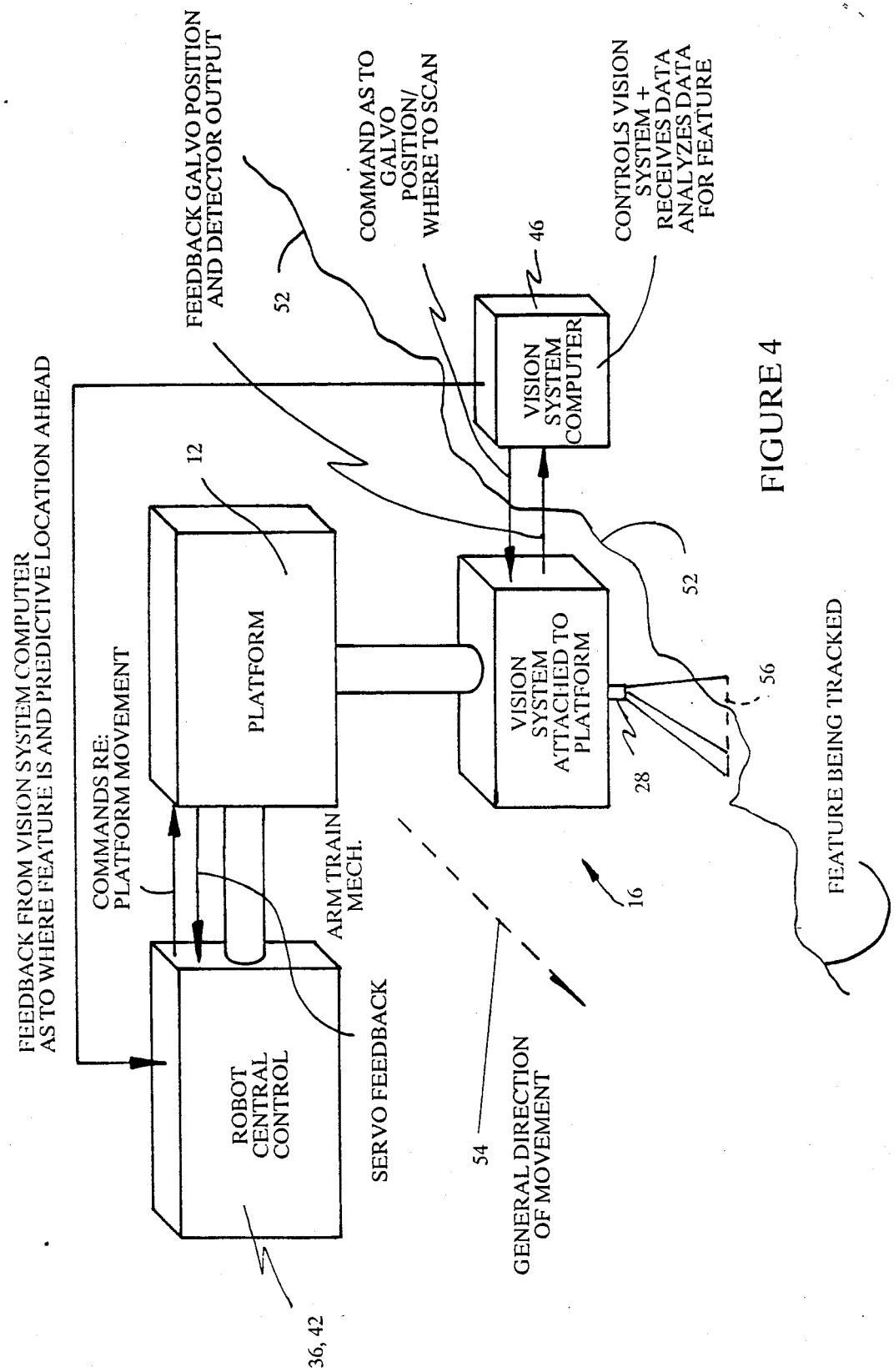
FIG. 4 is a block diagram perspective view showing the adaptive vision system of the invention as connected to a centrally controlled robot. In the mode of operation illustrated in FIG. 4, the vision system is conducting a preliminary survey or mapping of a feature by tracking the feature and feeding back position information to the robot central control, which then adjust its course accordingly.
Figure 5:
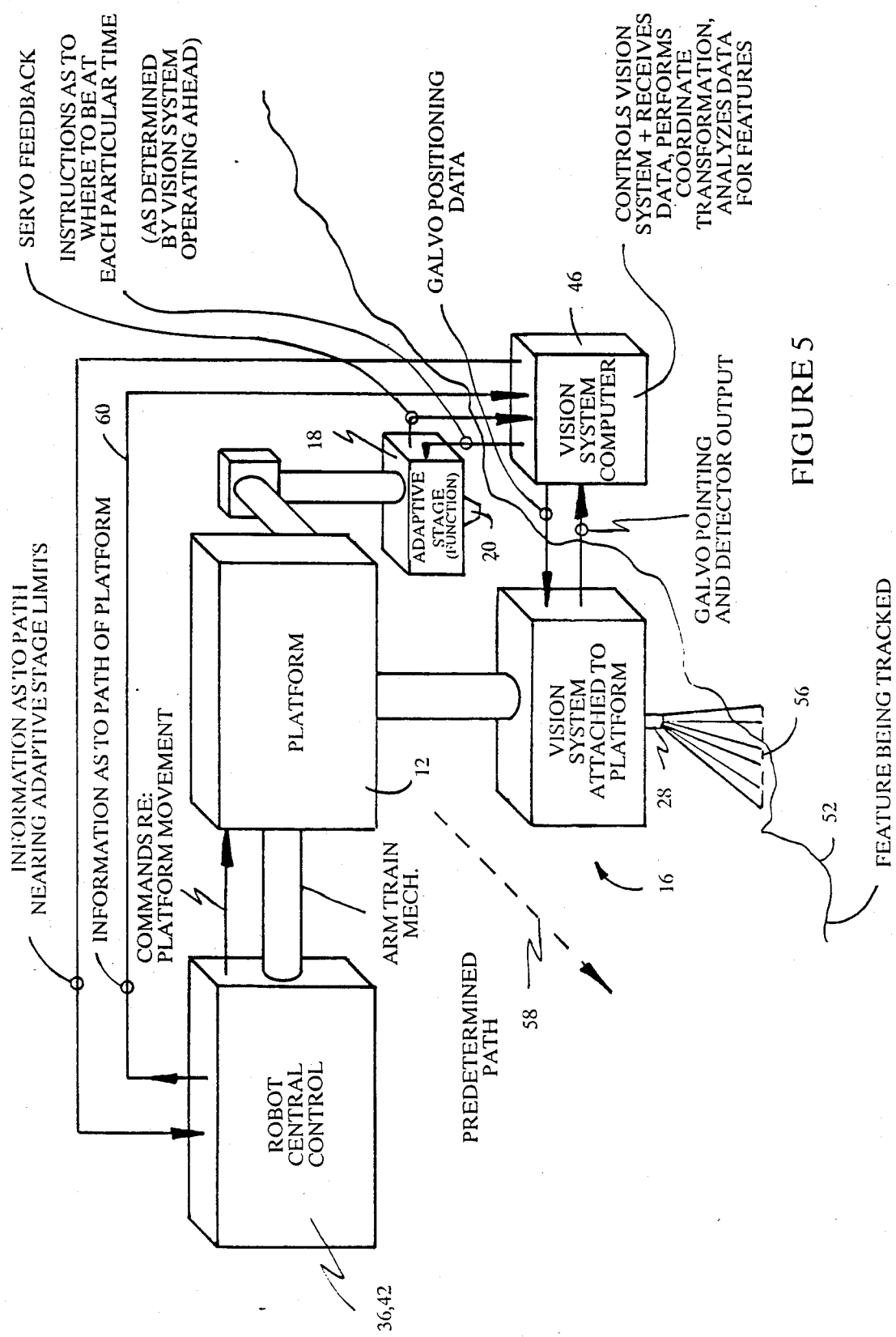
FIG. 5 is a block diagram in perspective similar to FIG. 4, but with an adaptive stage or function controller connected to the robotic platform along with the vision system, with the vision system and adaptive stage connected to a vision system computer. The vision system computer also receives information from the robot's central control as to the path the robot platform will take for short segments of time. The vision system computer controls the adaptive stage to adjust its position to correctly position itself at the feature, based on information from the vision system and the change in position of the platform between detection of a point and operation on that point.
Figure 6:
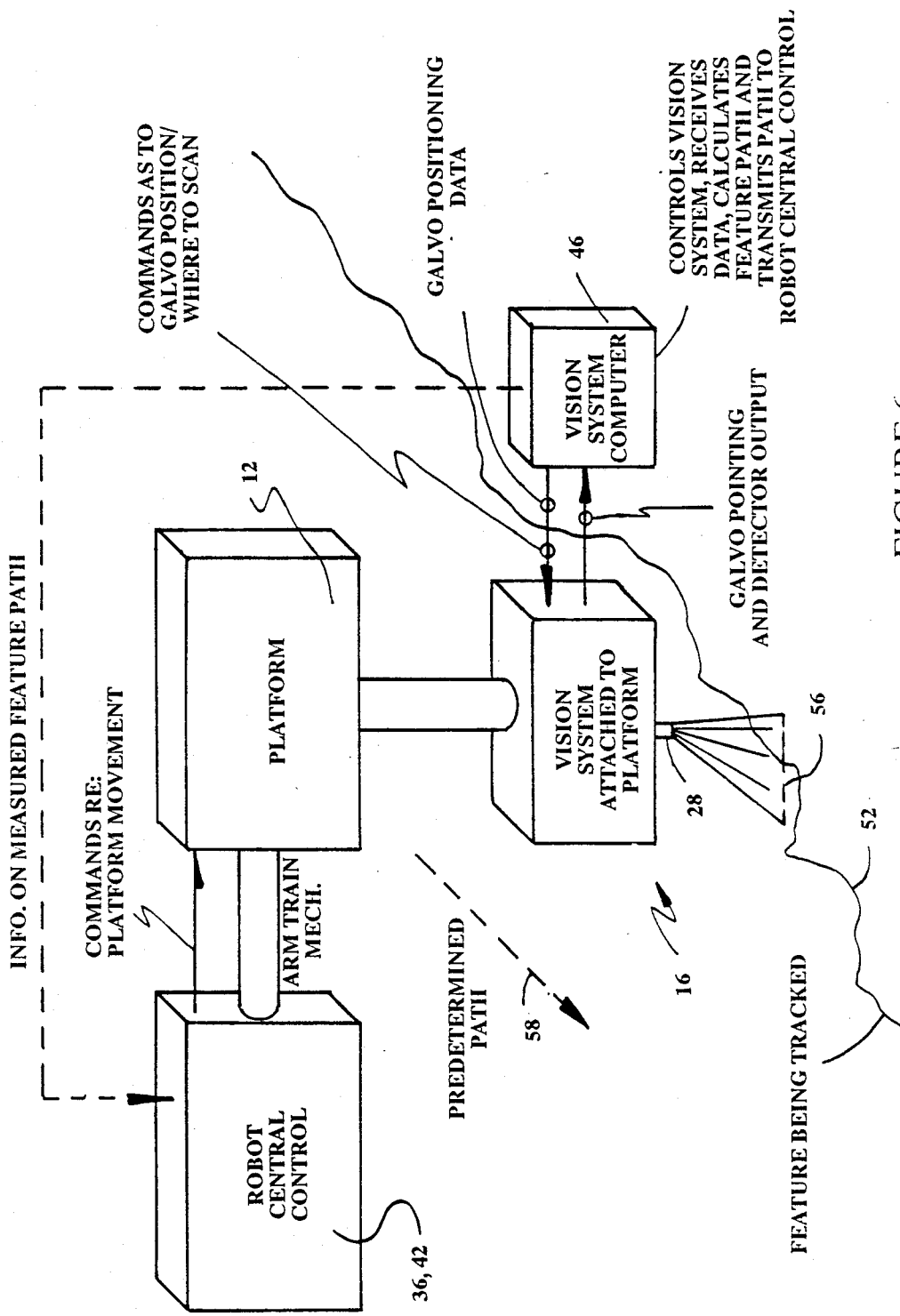
FIG. 6 is a block diagram view in perspective, similar to FIGS. 4 and 5, but without the adaptive stage being active and with the robotic platform being moved through a pre-programmed path controlled by the robot central control in accordance with previous input. In this mode, the vision system conducts a survey or mapping to more closely identify the path of the feature being tracked and calculates a corrected robot pre-programmed plan.

FIGS. 4, 5 and 6 are schematic perspective block diagram views, all showing the adaptive vision system of the invention as connected to the robot central control 42 and as used in different modes. In FIG. 4 the vision system 16 is used in conjunction with the robotic system to initially track and map a feature 52 on a workpiece. In this mode, there is no prior knowledge or predicted path or approximate path contained in the robotic or predicted path or approximate path contained in the robotic central control, and the botot will move the platform 12 in accordance with the tracking of the feature 52 by the vision system. The robot makes corrections to the path of the platform in "real time" or "pseudo real time", by feedback from the vision system computer 46 to the robot central control 42.

In this mode, because of the relatively slow reaction time of a large robotic system which can cover a relatively large volume of space, the robot moves at a slower pace than in other modes described in connection with FIGS. 5 and 6.

The slower movement of the robot mechanism helps the massive robot mechanism make path corrections in pseudo real time. Fast response movements cannot be made at a normal process speed of the system of the invention, which may be, for example, about one or two inches per second.

FIG. 4 shows the general direction of movement of the robotic platform 12, under control of the central robot control 42, at the instant represented in the drawing. The general direction is indicated by an arrow 54 in FIG. 4. As illustrated, the scanner assembly 28 of the vision system 16 scans a scanning line 56 across the feature 52 being tracked, and the scanning line 56 is of course viewed by the vision system camera (not shown in FIG. 4).

The vision system sends information to the vision system computer 46 relating to the feature's being found and its location, or that the feature has not been found. If the feature has not been found, the computer 46 sends additional commands to the vision system hardware, directing it to perform a different type of scan or to take data points more densely, or other steps involved in a recovery search mode, as discussed further below.

If the feature is found, its location is sent to the robot central control as indicated in FIG. 4. As also indicated, the vision system computer 46 determines a predictive location ahead for the feature 52, based on what the path 52 has been doing just previously, and it preferably also sends this information to the robot central control.

In response to these inputs, the robot central control makes decisions as to how to correct the path of the robotic system platform 12. Alternatively, with its predictive capability the vision system computer 46 can make all path correction decisions, and can send not only location feedback but also commands to the robot central control as to changes in course it should make.

If the vision system reaches a situation where the feature 52 is lost and cannot be recovered by all the adaptive recovery techniques it normally uses, an operator can be summoned. However, if recovery merely takes some additional time, to avoid the problem of the vision system's moving so far that the last known point on the feature 52 moves out of the field of view of the vision system, the robot central control can stop the movement of the robotic system platform 12, waiting for recovery of the feature.

Once the entire feature 52 has been tracked by the system shown in FIG. 4, the robot central control will have recorded in memory the precise path that the feature 52 follows on the workpiece. In theory, then, the robot control in a subsequent pass could direct the platform 12 to move along the path 52 with a fixed-position end effector, to perform a cutting, welding or other type of operation along the seam or feature 52. This would be a non-feedback, pre-programmed pass over the workpiece.

However, in practice this will not accomplish the operation to an acceptable degree of accuracy, for two reasons: (1) The repeatability or reproducibility of the robot's movements on a pre-programmed path, while very good, is not accurate enough to accomplish a precise operation such as a fine butt weld, particularly over a relatively long path. An error of 10 or 20 or 30 mils cannot be tolerated in many aerospace applications. (2) The path of the feature 52 may involve sharp or sudden turns, and the slew rate of the robotic system, along with its great mass, cannot be depended upon to make such sharp or sudden turns staying precisely on the programmed path. This is particularly true if it is desired to perform the function at a relatively fast speed, for example two inches per second. The system of the invention may use, for example a robotics system sold by Westing-house/Unimation, Model No. 6000. Such a system has a typical movement accuracy of ±1 tick, a tick being 28 milliseconds (or approximately 36 ticks per second). If the operation is being performed at two inches per second, a movement could be as much as 56 mils off target. In many applications much greater accuracy is required, such as within 5 or 7 mils.

Since the same inaccuracy can occur in the original mapping of the feature 52 on initial tracking as described above, the robot's information regarding the actual path of the feature 52 can be subject to similar errors, and the problem is further compounded.

Therefore, in accordance with the invention, the premapping information relating to the workpiece feature 52 preferably is used as input to the robot central control on a subsequent pass over the feature using the adaptive stage 18 as well as the vision system 16 on the robotic system platform 12. The end effector tool 20 on the adaptive stage is then manipulated in accordance with "real time" instructions from the vision system computer 46, based on input from the vision system as to the location of the feature 52 in the path ahead.

This mode of operation of the system of the invention is illustrated in FIG. 5, although in the mode illustrated in FIG. 5, the input to the robot central control 42 as to a preordained path of the feature may be from any of several different sources. For example, an approximate pre-determined path may be input by a lead through teach procedure. By such procedure, an operator can move the platform (the end effector) tool by hand to many different points along the feature 52 where breaks or turns in the path occur. At each such point, the operator pushes a button or otherwise instructs the robot control to "enter" that position, so that the coordinates of each such position are recorded in memory in the control. Subsequently, the robot control can be instructed to move the platform 12 automatically through the length of the feature 52 in a pre-programmed approximate path.

Other approximate path inputs can be by simply entering known coordinates of important points on the path into the robot control computer, or in some cases a pre-existing CAD program might be available as to the location of a seam to be followed on a manufactured part, and this information can be loaded into the computer robot control.

In any event, the system as depicted in FIG. 5 follows a direction of movement, at the moment illustrated, shown by an arrow 58, representing the path pre-programmed into the robot central control. The vision system is fixed to the robotic system platform 12, but has an envelope of reach within which it can scan forward of, behind, and to left and right, as well as directly at its actual position.

Behind the vision system and attached to the platform 12 is the adaptive stage 18 which performs the work function on the feature 52. This may be via the tool 20 illustrated, and the operation may be laser cutting or welding, for example. The adaptive stage 18 is behind the vision system 16 in time and distance as the robotic system progresses along the feature 52. A typical or realistic time lapse between the vision system and the adaptive stage would be about one second. This provides a time buffer within which the vision system 16 can send all data regarding the feature location to the vision system computer 46 and the computer 46 can formulate commands to the adaptive stage 18 to direct the end effector to the precisely correct location to perform the operation. Also, this time buffer serves to give time for the adaptive vision system to try a series of different recovery modes, in the event the vision system does not find the feature 52 on first scan(s). Thus, FIG. 5 shows commands going back from the vision system computer 46 to the vision system mechanism, whereby the scan and camera mechanism are directed to go to different scanning modes, data density, scan location, different mapping techniques such as gray scale or topology, etc.

FIG. 5 also shows a line of information 60 going from the robot central control to the vision system computer 46. This information comprises the location of the platform 12 in real time in terms of where the platform is supposed to be on the preprogrammed path, by which the central control is directing the movements of the robotic platform 12. The vision system computer 46 needs this contemporaneous location information regarding the platform 12, along with the location where the platform will be according to the pre-programmed path one second from now. The computer accomplishes coordinate transformation to compute the location at which the end effector or tool should act relative to the platform, based on this very small segment of the robot's pre-programmed path, for each subject data point along the path of the feature 52. Such coordinate transformation is needed because the vision system 16 first collects data regarding the points on the feature 52 in terms of platform coordinates, since this is the vision system's only frame of reference. These platform coordinates are transformed via solid geometry calculations to new platform coordinates to apply at the time the tool will act on the particular point in question. In other words, the system uses platform coordinates, but adjusts them for the change in position pre-programmed for the platform during the narrow segment of time (e.g., one second) between vision and operation.

Then, when the adaptive stage reaches the subject point (based on time) for which data was previously taken by the vision system, the end effector 20 is manipulated by the adaptive stage to precisely perform the operation (such as welding) at the correct location.

The robotic system itself is accurate to a very high degree over short distances, and this is relied upon for accuracy of the operation depicted in FIG. 5 in accordance with the present invention. Although, at the time a point on the feature is detected, the platform may not be in actual space exactly where it is pre-programmed to be (due to errors in repeatability), it is extremely accurate in terms of following a pre-programmed change of position over a very short time.

Therefore, by the procedure and system shown in FIG. 5, a robotics system is moved in a pre-ordained approximate path generally along the course of a feature, the approximate path always being close enough to the actual feature to be within reach of the end effector tool as controlled by the adaptive stage. Corrections are therefore made to the position of action of the end effector in "real time", by manipulating the end effector to the correct point a very short time after that point has been precisely located by the vision system.

In accordance with the invention, the adaptive stage is directed to the detected point a fixed time after the point is located. This is of course coordinated with the speed at which the operation is being performed. If the operation is performed at two inches per second, and the spacing between the vision system and the end effector is two inches, the time buffer between the two is one second. Even though the pre-programmed path is inevitably of a different length than the actual feature 52, the computer 46 and the adaptive stage preferably operate by time base. Thus, the end effector must perform its operation on the feature 52 at a somewhat faster rate of movement per second, in many cases. The pre-programmed path may be a straight line over a series of local convolutions in the actual feature 52. The adaptive stage still moves at the nominal rate of, for example, one inch per second on the pre-programmed path, but the end effector 20 always follows the path of the actual feature. The result is that there may be less weld, for example, in certain areas where such convolutions occur. Nonetheless, in most cases, the applied weld will be within a quantity window specified, and the resulting weld will still be up to specifications.

However, in extreme cases, the vision system computer and the central control can be programmed to slow the platform down to a lower rate of movement where such extreme convolutions occur.

FIG. 6 illustrates another mode of operation of the system of the invention, wherein the system is used only for mapping a feature and not performing an operation on the feature. In FIG. 6, the adaptive stage is not shown, since it is not used in this mode.

In the procedure illustrated in FIG. 6 there is no path correction feedback from the vision system computer 46 to the robot central control. The robot central control is under a pre-programmed instruction regarding an approximate path which has previously been input. The previous input can be, as before, from a previously existing CAD program regarding a production part; from a prior lead through teach procedure as described above, or from an operator visually following the feature 52 using a "joy stick" steering mechanism, controlling the robot controller which in turn controls the platform 12, for example.

In the mode depicted in FIG. 6, data is collected as to the actual path of the feature 52 on the workpiece, by use of the vision system 16 as the platform travels through a rough preselected approximate path, which is not corrected in real time. As illustrated, the vision system computer receives platform location information from the robot central control, in order to perform coordinate transformation, and information is passed back and forth between the vision system mechanism and the vision system computer, as to whether a feature is found, where the feature is found, and instructions back to the mechanism for predictive scan modes and instructions for recovery search. The platform 12 is at the end of a robotic arm train controlled by the robot central control and commands are shown from the robot central control to direct the platform through the preselected path.

Figure 7:
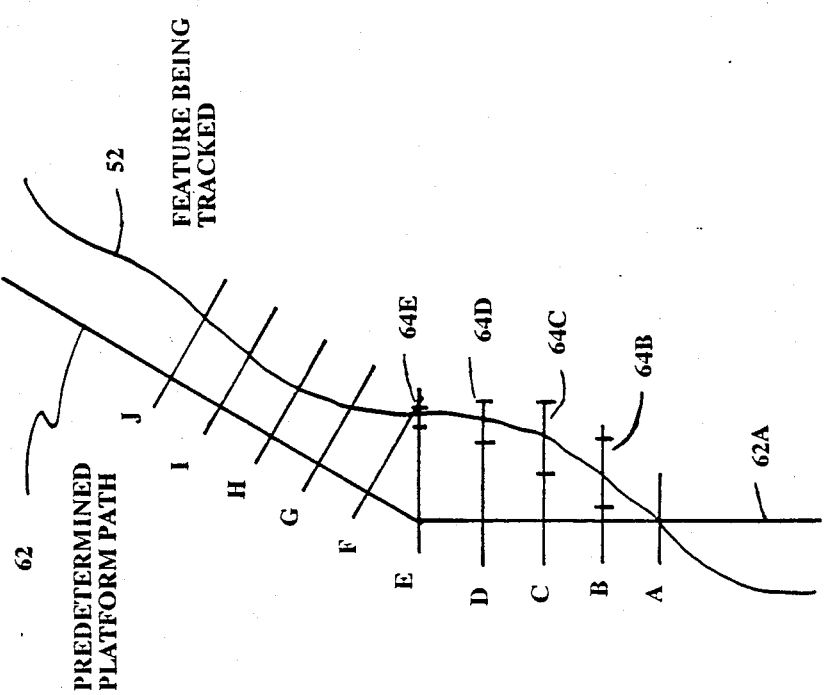
FIG. 7 is a schematic plan view showing the path of a feature on a workpiece, a pre-programmed path to be followed by the robotic platform, and the taking of data along the feature by the vision system of the invention.

FIG. 7 is a schematic plan view showing the feature 52 and showing a pre-programmed approximate path 62 over which the robotic system platform is moved.

In the example illustrated, there is a point A where the robot end effector tool is performing an operation such as laser welding at a null or zero or "normal" position of the end effector tool. Thus, the pre-ordained path 62 crosses directly over the actual feature 52 at point A, as illustrated. This can be assumed because point A can be a starting point, and the system can be instructed and programmed so that its pre-selected path crosses the feature at point A, so that the end effector is in a null position at point A.

The pre-programmed path 62 shown can be assumed to be the path of the null position of the end effector tool.

Before the end effector reached point A, the vision system has taken data on a number of points ahead in the feature 52, i.e., points B, C, D and E as illustrated. The vision system thus might be four data points ahead of the end effector tool, in a particular mode of operation and in this particular example.

Accordingly, at point E the vision system might be determining that the feature 52 is, say, 8 mils away from the predicted path 62 of the tool. Prior to scanning at point E, the vision system may have determined that, for example, at point B the feature 52 is 2.5 mils to the right; at point C, 4.5 mils to the right; and at point D, 6.5 mils to the right.

As the robotic system arm or platform (12, in FIGS. 4, 5 and 6) progresses, generally at a predetermined steady rate, it does not correct itself for the deviation ahead at points B, C, D and E. Instead, it follows the pre-programmed path 62, but the adaptive stage controlling the end effector tool is moved to the right so that it acts at a point precisely the correct distance from the pre-programmed path to accurately weld the feature 52. Of course, this actually is occurring in three dimensions, with X, Y and Z axes, but for clarity in reference to the drawings, two dimensional movements and deviations will be discussed.

The adaptive stage acts as a manipulator or inner translator system, taking care of the X, Y and Z deviations of the actual feature path 52 from the pre-selected path 62 of the robot. The deviations of the feature from the pre-selected path can never be wider than the capability of the adaptive stage to translate. Such deviation maximum, for example, might be about one inch.

When the vision system reaches point E, which in this example is the starting point wherein the end effector tool is over point A, the pre-selected path 62 in this example makes a turn to the right. However, the robotic platform still continues straight ahead for a time in this example, since the null point or center line of the end effector is to be kept on the preselected path 62 up to the point E. Therefore, the vision system must scan to the right to obtain points F, G, H and I on the feature, from a different frame of reference than what will be the case when the end effector is corrected from its platform position to act on the feature. This is not a problem with the system of the invention, since the central robot controller sends data to the vision system computer, giving the vision system computer information relating to segments of the preselected path, i.e. changes in position to be undergone by the platform between detection of a feature point and action on that feature point. Therefore, even though points F, G, H and I on the feature 52 are taken by the vision system when it is in one frame of reference, these are changed to another frame of reference by coordinate transformation. Platform reference coordinates taken when a point is detected can thus be transformed to new platform reference coordinates applicable when the operation is performed on that point.

Another feature of the system of the invention illustrated in FIG. 7 is the use of predictive windows in the vision system's scanning for the feature. In FIG. 7 a first scan window or scan bracket 64B for the point B is shown as a relatively wide window. However, the predictive mode of operation of the system of the invention extrapolates or predicts from data taken where the feature might be at the next point of taking data. Thus, a narrower predictive scanning window 64C might be used at point C. If the actual feature point is within the window 64C, the vision system will have knowledge of where the feature lay in that window and can scan a still narrower predictive scan path 64D at the next data taking position. The same is true for the next scan window 64E as illustrated in FIG. 7.

In this way, the available resources and time of the vision system are allocated so as to be used in the minimum possible way. Taking less data allows the system and work process to move faster.

The tracking mode of operation of the system of the invention has so far been described. The system of the invention is also capable of an initial search to locate itself on the feature to be tracked. In such an initial search mode, the robotic platform itself can be put on the pre-selected path 62 in advance of the point A, i.e. on a lead-in line 62a in advance of the point A. If the feature is, for example, a crack to be welded, the operator can input to the system (via the operator input console, which is connected ultimately to the vision system computer 46) that the feature to be searched for is a crack. By other prior input knowledge, the system may have been informed of the characteristics of a crack as seen by the vision system. The expert system software included in the system of the invention is capable of building a growing base of knowledge due to these inputs and due to failures and successes in recovery modes, as described below. The geometry or topology of a crack would be different from that of a lap weld or butt weld, for example.

The vision system is instructed on initial search to scan until it finds the crack. In this mode, there may be an operator input to verify that the crack has been found. The initial search requires obtaining two points on the feature curve 52, so that the vision system can project ahead to open a predictive window. As mentioned above, larger predictive scan windows will be opened initially, since the system does not have much data on which to base a projection of where the curve is going. After a third point is found, in the first predictive window, there will be better data to extrapolate. Extrapolation can be linear based, quadratic, etc.

Figure 8:
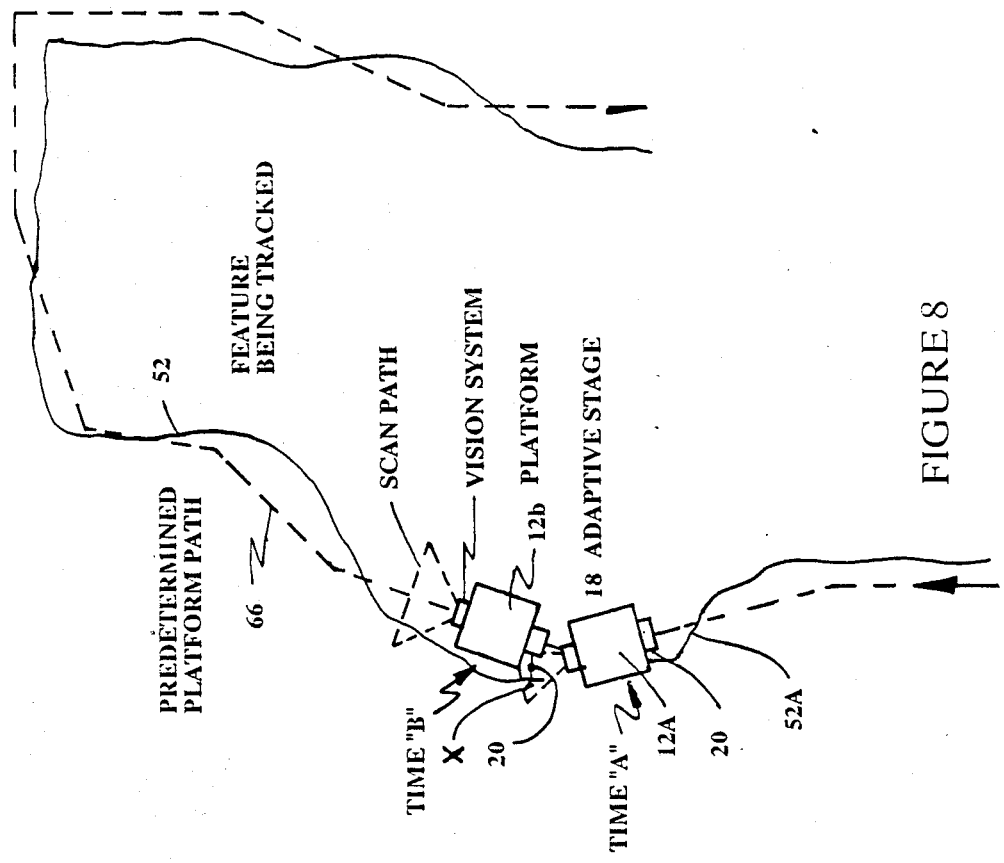
FIG. 8 is a schematic plan view showing a predetermined or pre-programmed path and the different actual path taken by the feature being tracked, and showing the robotic platform being moved along the pre-programmed path.

FIG. 8 is a schematic plan view illustrating an example of a pre-programmed path 66 (shown in dashed lines) which might go through a number of different linear segments (although the segments need not be linear) in approximating the path of the adjacent workpiece feature 52. FIG. 8 shows two successive positions of the robotic system platform 12, a first position 12a, shown in dashed lines, and a second position 12b, shown in solid lines. The relationship of the tow positions 12a and 12b in this example is such that a point X is located by the vision system in the first position 12a, and the point X is subjected to the function or operation (such as welding) by the end effector tool 20 in the second position 12b.

The platform position 12a shown in FIG. 8 occurs at time A, while the position 12b occurs at time B. The system of the invention preferably is a time based system, and if it is welding at two inches per second and the distance between the vision system and the end effector is two inches, the elapsed time between time A and time B will be one second. (The system could alternatively be a distance based system or a partially distance based system.)

As shown in FIG. 8, in this example the robotic platform 12 has made a turn along the path 66. The actual feature path 52 may go through a considerably greater length between the two platform positions 12a and 12b than that distance traversed by the platform along the pre-programmed path 56. The adaptive stage preferably is limited to remain within a certain envelope of space forward or back of its known position along the preselected path, and although the weld may nominally be performed at two inches per second, for example, it will actually be performed at a somewhat higher rate through the convoluted portion 52a of the feature.

However, the system of the invention is adaptive in many respects, and by the time the platform is at the position 12a, the vision system will already have all data relating to the nature of the feature path through the convoluted portion 52a The control computer 46 can therefore calculate the actual weld rate over any selected interval of the feature path 52 which has already been surveyed, and if the actual weld rate falls outside acceptable limits, it can send a message to the central robot control to slow down the platform's movement for a certain interval which will include the convoluted area 52a. The robotic system preferably is programmed to travel at a constant velocity. It therefore cannot make turns at corners but must have a radius at each turn to avoid having to stop and change direction. The constant velocity helps in coordinates based on pre-programmed platform changes of position, since the system is time/speed based in the preferred embodiment. Alternatively, the robotic system can be programmed to stop and change direction at each corner, with all decelerations and accelerations accounted for in coordinate transformation.

Figure 9:
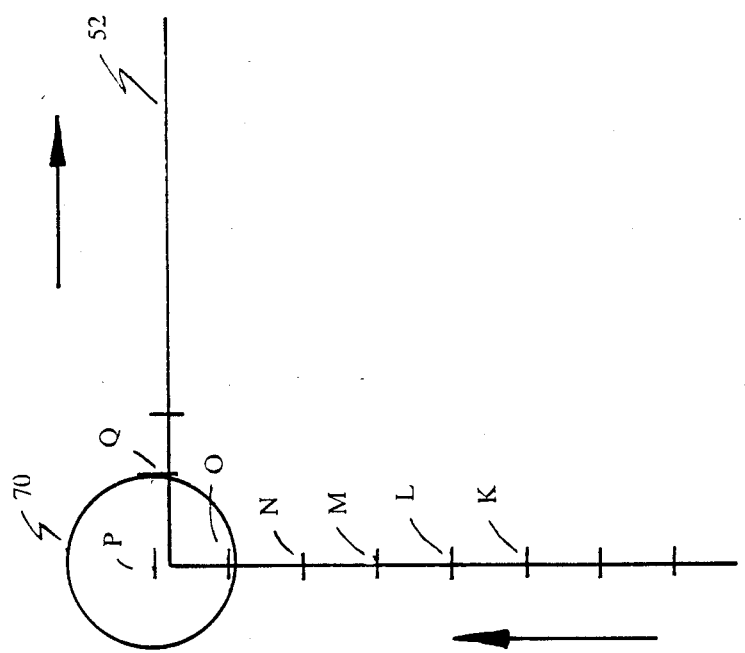
FIG. 9 is a schematic plan view showing a small detail of a workpiece feature wherein the feature makes an abrupt turn, and showing how the adaptive vision system might recover the feature after first losing the feature at the turn.

FIG. 9 is an schematic illustration of a specific situation which might occur in the actual feature path 52—in this case, a sharp turn comprising essentially a right angle. In this example, scans of the vision system might be taken at points K, L, M, N and 0, with the end effector in the example as given with respect to FIG. 7, four of such scan points behind.

As the next predictive window is scanned at P, as shown in FIG. 9, the scan does not find the feature 52, since the feature 52 has made a turn. The vision system computer 46 may then direct to scan a wider window, take denser data points, turn to gray scale or topology as outlined above, etc., all of which will fail to find the feature. This is the recovery search mode of the system of the invention. Once these alternative recovery scans fail to find the feature 52, or even before any of such scans are tried, the recovery search mode may scan in a different pattern, such as in a circle 70 as shown in FIG. 9. Such a scan circle will include the last known point at 0 on the feature 52, as shown. In this case, the circular scan will recover the feature, by detecting the feature leaving the circle at point Q. The radius of the circle can be calculated by the system based on the speed of movement and the elapsed time since the point 0 was located. At the same time, the vision system continues to advance forward along with the robotic platform 12, so that the generation of the scan circle 70 is relatively complex but can be accomplished by the control computer 46 by allowing for known changes of position undergone before and as the scan circle is generated.

The circular scan, by including the point 0, verifies the point 0 as well as locating the point Q.

Assuming a welding operation, the mode shown in FIGS. 7, 8 and 9 is one in which the vision system operates ahead of the weld operation, for example one second. Thus, in the recovery search mode, the weld operation can continue for one second after the last valid point was found, using valid data. At the end of the one second, if recovery has not been made, the end effector will reach a point where there is not valid data.

The control system by the fact that the point Q was found to the right, can determine that there has been a major change in direction. The point was predicted to be at point P, but the next actual point on the path was found at point Q. Following this, a number of different scan modes can be used. A smaller circle can be generated to locate points closer to the turn than the points O and Q; or the system can move backward from the point Q with predicted windows, trying to find the transition point or corner then the vision system can scan with predictive windows from the known point 0 forward---all while the platform is moving. The system might shift to a higher resolution of scanning than it had been using, since something unusual happened to the feature 52 within the circle. The vision system scanner can scan anywhere within its field of view which may be, for example, approximately a two inch by two inch field of view. The fact that the platform is moving does not matter, so long as the time buffer has not been used up, since relatively simple calculations will always place a scan at a located point correctly after the position of the platform is taken into account.

By the exemplary method of scanning back from the point Q and scanning forward from the point 0, the corner or transition in the feature 52 will ultimately be located. Once it is located, not all of the intermediate points within the circle 7 will be needed.

After such a recovery operation, most of the buffer time between the welder and the vision system may have been used up. The vision system thus adapts to the circulation and operates at a faster rate for awhile by taking less data. This is an important adaptive feature of the invention, since, if the same amount of data were required to be taken in every scan, and/or the scan density were the same in every situation, the system would have to be designed to move at a rate corresponding to the worst conditions. Some of the adaptively variable features of the present system are digitization rate (or rate of taking data points or density of data points in a scan), laser power, and pointing angle, all of which the computer 46 can control.

Scanning resolution will be different for different scan windows or predictive windows. As the laser beam is scanned and moves across a scan path, its current location is being digitized, and the rate of digitization can be varied. For example, if a scan window is 50 points across in accordance with selected criteria, the vision system may be looking for a crack or butt seam, as in examples discussed previously. In such a transition, there will be shadowing and energy drop where the vision laser beam falls off an edge. The vision system is programmed to look for the transition of this type. The vision system in selecting the type of scan for the predictive window may have a specific narrow portion of the window where the feature is most likely to occur, and digitization may be most dense in this narrow portion of the window. In wider portions of the window, digitization points may be spread considerably farther apart, but they are included in case the feature moves outside the most likely portion of the window.

The above exemplifies preferred procedures with which the system of the invention may work with structured light or laser based 3-D Vision. The principles of such vision or mapping are well known in the field, and do not in themselves form a part of the invention. As discussed above, other systems can be used and can be included along with laser based 3-D vision in accordance with the invention, for handling situations where 3-D vision cannot find or recover the feature.

Figure 10:
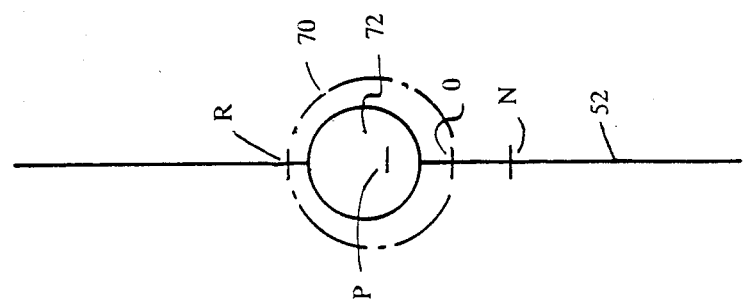
FIG. 10 is a schematic plan view showing the occurrence of a hole which interrupts the feature, and indicating scanning patterns which might be used in attempts to recover the feature.

FIG. 10 shows a situation where the feature 52 follows a generally predictable course, but is interrupted by a hole 72 in the workpiece. In this case, the vision system of the invention can conduct a recovery search similar to the example described in connection with FIG. 9 where the feature made a sharp turn. In FIG. 10 the vision may have conducted scans N and O, finding the feature as predicted, and then a scan P wherein the feature is not found because of the hold 72.

Again, a circular scan 70 may be used in the recovery mode, which will include or come close to the last known data point 0 on the feature. The recovery search will then find the feature continuing again at point R. Further scans at higher resolution and at higher frequency of scan lines can be taken back from the point R and forward from the point 0, to locate the edges of the hole. Then, if the system has been programmed to recognize a hole, or if it has previously conducted a recovery search as just described and found the feature 52 terminating as shown in FIG. 10, and was then instructed that this situation constitutes a hole and that the feature will continue forward on the other side of the hole, this system can use this prior knowledge to continue performing the operation with the end effector tool on the other side of the hole. If the operation is laser welding, for example, the vision system/adaptive stage computer 46 can shut off the high-welding laser as the weld nozzle passes over the hole.

Figure 11:
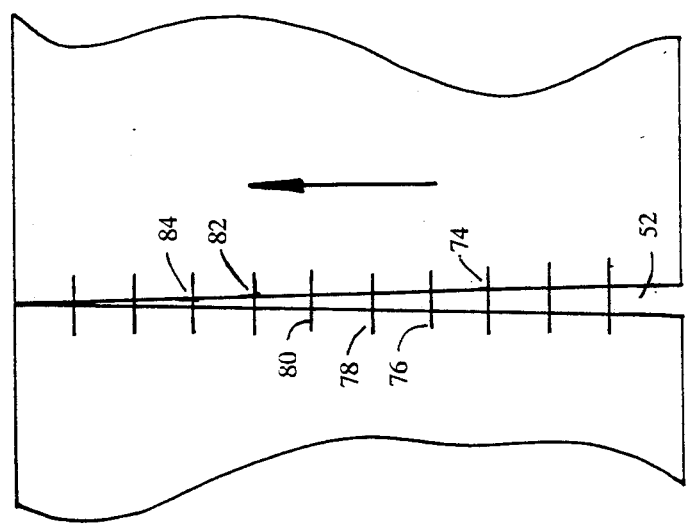
FIG. 11 is a plan view showing a workpiece feature such as a crack or seam, in a detail wherein the seam is progressively narrowing, and indicating that the adaptive vision system will predict that it must switch scanning modes in order to avoid losing the feature.

FIG. 11 shows a portion of a feature 52 which is becoming progressively narrower. A series of scans 74, 76, 78, 80 and 82 are taken, and the vision computer can calculate and extrapolate g that, because of the resolution of scans being taken, at the next scan 84 there is a good chance that the feature will not be found by 3-D vision. For example, if the scan resolution used has a resolution of 10 mils, and the crack is narrowing to and probably below 10 mils, the crack may be missed up ahead. Therefore, the system may switch to gray scale vision, increasing the resolution for the next scan 84.

If the crack or feature 52 were narrowing but were still considerably wider than the maximum resolution capability of the 3-D vision system, then the computer 46 could simply increase the resolution of the scans beginning at the scan position 84.

These are some of the adaptive features of the system of the invention. All vision systems will fail in some situations, but the system of the present invention will work to recover in various modes of recovery searching before it calls for operator help. With the variety of backup recovery search modes available with this system, it has a much better chance of recovering the feature than systems previous to this invention.

Figure 12:
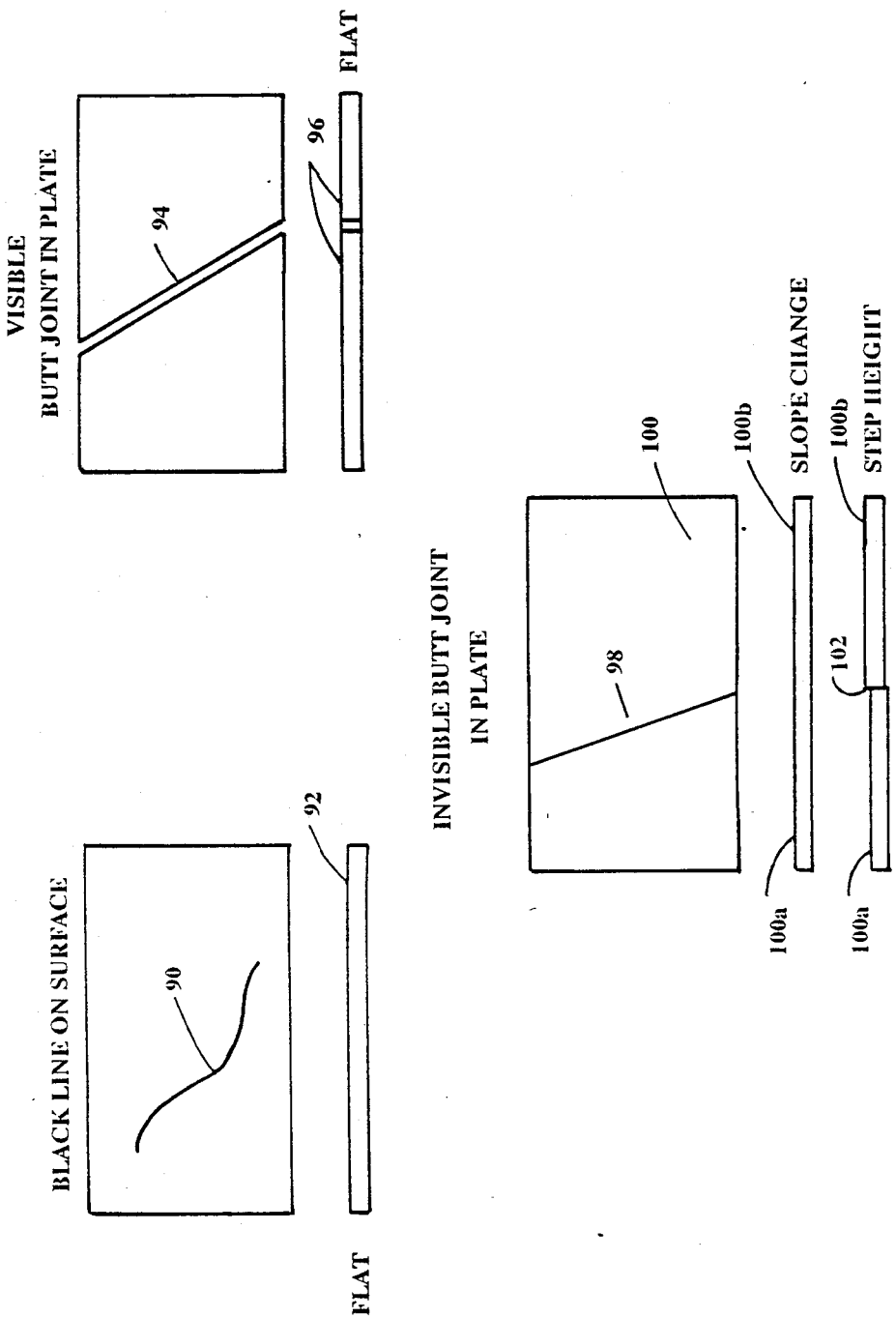
FIG. 12 is a schematic representation showing some examples of types of features and feature conditions that may be tracked in accordance with the invention.

FIG. 12 shows several of the types of features and situations which can be encountered by the system of the invention. The vision system may find and track a black line indicated at 90 on a flat workpiece 92, by using the gray scale vision subsystem wherein the system looks for contrast. FIG. 12 shows a visible butt joint 94 in a flat plate or pair of butted plates 96. In this case, the butt joint is wide enough to be easily visible by the structured light or laser based 3-D mapping system.

FIG. 12 also illustrates a situation where an invisible butt joint 98 may be the feature to be tracked in a workpiece 100. The feature 98 may be "invisible" in that the two plates sections are so closely fitted together that the structured light mapping system cannot detect any transition and in some cases even the gray scale mapping system will not find the transition. However, there may be a slight slope change between the two plate portions 100a and 100b, as illustrated, or there may be a very slight step height 102 between the two plate portions. Other modes of operation of the vision system can then be put into effect, as discussed in connection with FIGS. 13, 14 and 15.

Figure 14:
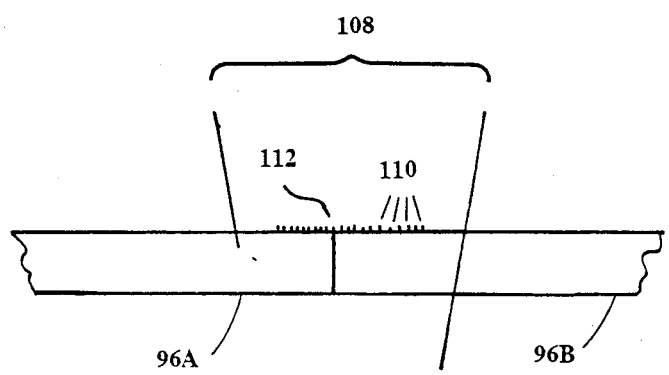
FIG. 14 is a schematic elevation view similar to FIG. 13, but showing a closely butted seam and the use of densely clustered data points in a scan by the adaptive vision system, in an attempt to find the feature.
Figure 13:
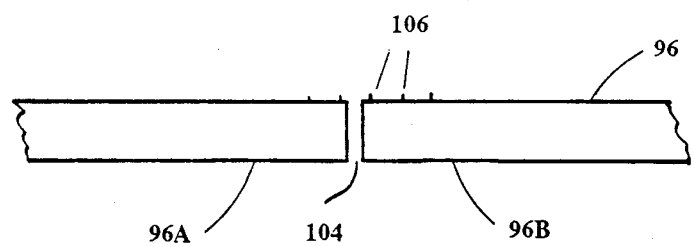
FIG. 13 is a schematic elevation view in section illustrating a relatively narrow seam or crack, and a situation wherein the data points taken by the vision system are too sparse to find the seam.

In FIG. 13 a simple butt weld condition is shown, wherein the plate 96 has two sections 96a and 96b with a joint or seam 104 between them. Digitization points 106 are shown in a scan line over a predicted window which includes the feature 104. In the example in FIG. 13, the digitization may not be dense enough to find the feature 104, in which case the system can attempt to recover the feature using a finer digitization rate. FIG. 14 shows a condition where a very fine digitization rate is used on a scan within the predictive window 108. Data points 110 are taken at a very high density, up to the highest density and resolution possible with the vision system used. However, the two plate sections 96a and 96b may be, in some rare circumstances, so well fitted together that the detection of the joint 112 may not be possible within the resolution capability of the system.

In that case, a system can first switch to gray scale analysis, as discussed above in connection with the narrowing crack illustrated in FIG. 11. For such analysis, if high-resolution data points were already taken, the system need not take additional vision points 110, but can analyze the same data by gray scale analysis.

However, in the very unusual situation where the two plates sections are fitted too closely together to bind the feature within the resolution capabilities of the system by 3-D analysis, other recovery modes may be used. For one thing, intensity of the reflected light as detected by camera in the vision system can be examined. In many situations, if the two plate sections are sheared metal, there will tend to be a small lip on the sheared edges. This can show up as a sharp increase in intensity of reflected light, followed by a sharp decrease in intensity and then a normal level of reflected light, as the scan moves across the sheared edge. Very small facets on the shear lip can result in such a shifting of the reflected light intensity. Such a transition in the reflected light can indicate the location of the feature. This can be a part of the gray scale analysis, with the computer "looking" for this particular pattern.

Figure 15:
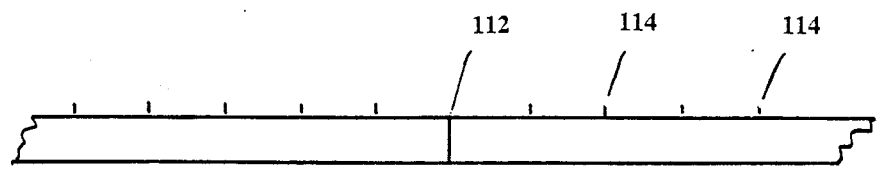
FIG. 15 is a schematic elevation view similar to FIGS. 13 and 14 but enlarged to show another recovery search procedure of the adaptive vision system wherein data points can be taken on both sides of a predicted window containing the feature, and wherein the data from the two sides are fitted to two respective lines in an attempt to find an intersection of the two lines which might indicate the position of the feature.

There are very few cases where a butt joint would not be found using the vision analysis as set forth above. It is very unlikely two plate sections could be butted together at exactly the same height, without any shear lip or gap. However, even assuming such a joint could be put together, to the extent that it could not be felt with a finger and perhaps even be seen by eye in diffuse lighting, the system of the invention can search for the feature using a topology mode. This is illustrated in FIG. 15. The system can use data already taken, or it can open a new windows of scan lines. As shown in FIG. 15, data points 114 may be taken on both sides of the joint 112. The data points 114 can be those points taken for topology and gray scale analysis, or, in some cases, they may cover a greater width away from the joint 112.

By topology analysis, three dimensional curves detected by the vision system for plate surfaces to the left of the joint 112 and to the right of the joint 112 are fitted to lines by the computer. The computer then looks to see if there is an interception point of the two lines, as would be the case if the two plate sections lie in slightly different planes. The slight angle between the planes of the two sections will then show up in the computer, and it can be assumed that the feature lies at that intersection.

FIG. 16 is a system block diagram showing system architecture of the vision system of the invention.

As indicated in FIG. 16, the computer shown as 120 in this figure sets the argon ion vision laser to the proper power level as determined by conditions. The computer 120 makes decisions as to where to point the galvanometers by sending out a digital signal to the digital to analog converter 122, which then sets the positions for the X and Y galvanometer scanners 124 and 126. The X and Y galvo scanner positions are controlled by their respective scanner servo amplifiers No. 1 and No. 2 as shown in the drawing.

The camera assembly 32 (shown in FIG. 2) comprises a detector which may be a lateral effect PIN photodiode 128. The detected signal is sent to four amplifiers 1X, 2X, 1Y and 2Y as shown. These amplifiers must have equal gain, and the system includes software routines for correcting out any remaining imbalance. Such imbalances if uncorrected lead to position errors based on changes in intensity. Preferably the system includes an autocalibration feature wherein the laser power is changed by the computer and the calculated position detected by the detector is measured. This routine is carried out without moving the galvoscanners. Therefore, detected changes in position must be due to changes in intensity rather than actual changes in position. This forms a correction table for calibration by the computer.

The signals from the four amplifiers are sent to an analog to digital converter 130. This produces four digital signals representing each of the amplifiers 1X, 2X, 1Y and 2Y. These signals are processed by the vision system computer 120 which carries out calculations to yield the X and Y positions from the digitized amplifier signals. The four digitized signals, which can be called A, B, C and D representing the four amplifiers 1X, 2X, 1Y and 2Y, are the subject of arithmetic calculations which can be used to analyze the collected data in either 3D or gray scale modes. Arithmetic calculations as follows: $X=(A-B)/(A+B+C+D)$; and $Y=(C-D)/(A+B+C+D)$. However, the summations forming the denominators in these equations represent the light intensity, which can be used separately for gray scale analysis, or the gray scale analysis can be used in conjunction with the 3D analysis to eliminate bad data points.

After processing of the data begins in the computer 120, several corrections are used to improve the accuracy of the data. In general there are three calibrations required: calibrations for galvonometer pointing errors, amplifier gain balance, and detector linearity.

To improve the signal-to-noise ratio of the entire system, the system may include a light modulation 132, which modulates the vision system laser beam to improve the discrimination of the vision system laser light from the background light, which might include, for example, light from a welding process being performed near the vision system by the end effector tool.

Figure 17:
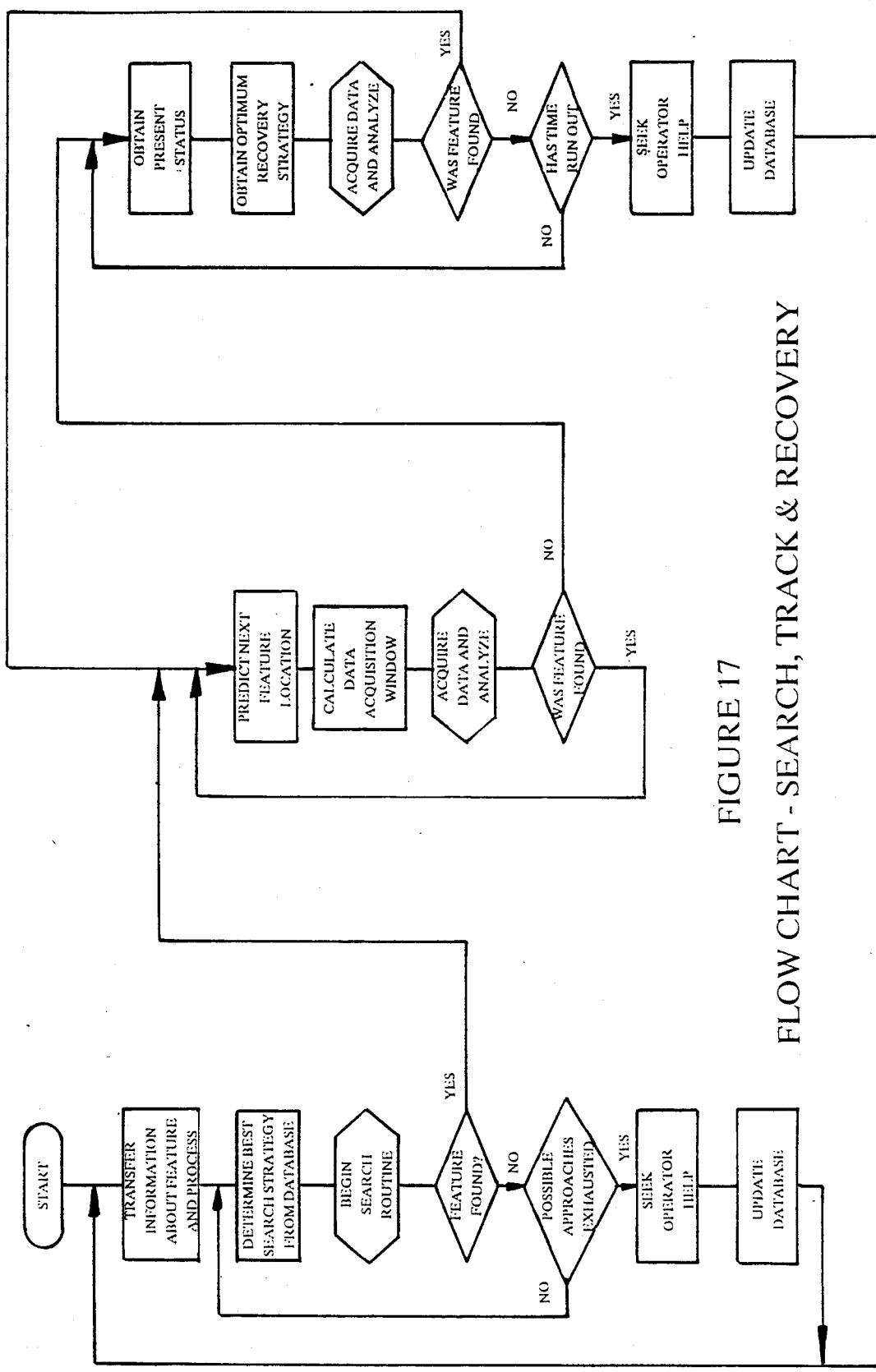
FIG. 17 is a flow chart indicating the general procedure in accordance with the invention for initial search, track, and recover modes of the adaptive vision system of the invention.

FIG. 17 is a flow chart diagram indicating the general procedure for initial search, track and recovery modes of the adaptive vision system of the invention. The left column of FIG. 17 represents the initial search mode, the middle column the track mode and the right column the recovery mode. As indicated, when the feature is found in the initial search mode the system moves into the track mode, and loops through the track mode until the feature is not found. At that point, the system moves into the recovery mode.

The vision system loops through the recovery mode as long as the feature is not found. If the feature is recovered within the time allotted (for example, before the welding operation catches up to the vision system), the system returns to the track mode. If time does run out, the system flags the operator for help, and with the operator's input the data base is updated. Whenever the system must stop in this way, it returns to the initial search mode, as indicated in the flow chart. Of course, at the end of a track, i.e. the end of the feature itself, the system will stop tracking or attempting to recover and will seek operator help. The normal termination mode for tracking a feature will be the failure of the recovery search mode to recover the feature after exhausting the alternative recovery techniques available, and after time has run out.

Figure 18:
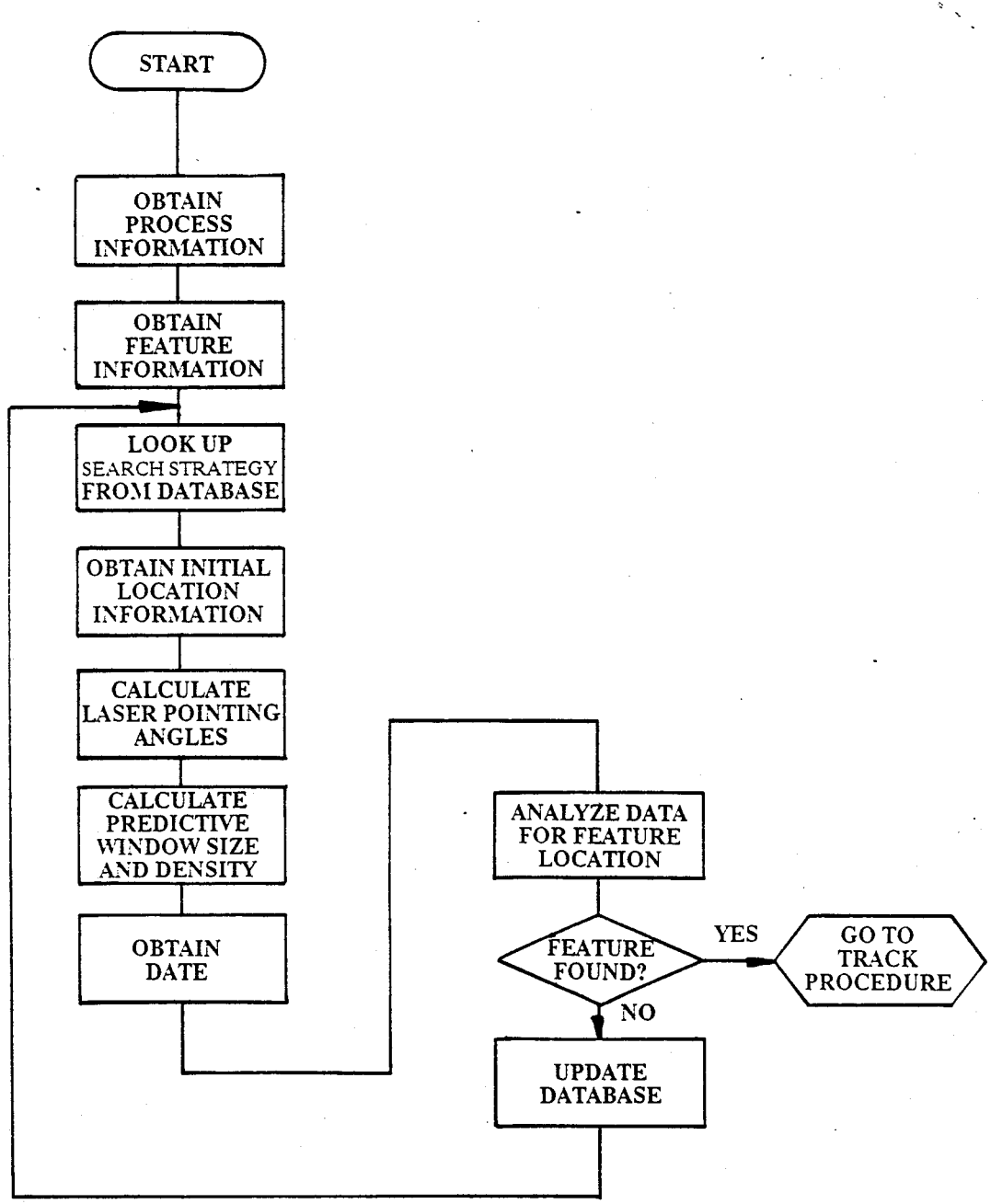
FIG. 18 is a flow chart illustrating in greater detail the procedure for locating a feature on initial search.

FIG. 18 illustrates in greater detail the procedure for locating a feature on initial search, as represented generally on the left side of FIG. 17. As shown in FIG. 18, in the initial search mode-processed information and feature information are input into the system initially. This might include, for example, the information that a certain type of weld is to be made one inch away from a feature, and a description of the feature to be searched and tracked.

The initial search mode involved the computer's looking up search strategy from a data base, and the obtaining of initial location information from the central robot control, as to where the platform and vision system initially are located.

The system then calculates laser pointing angles and predictive window sizes and densities, preliminary to obtaining data. Obtained data is then analyzed, and if the feature is found the system proceeds to the track mode as indicated. If the feature is not found, the data base must be updated, which will usually involve input from an operator, and the initial search mode loops back to the search strategy look up function as indicated in the flow chart.

Figure 19:
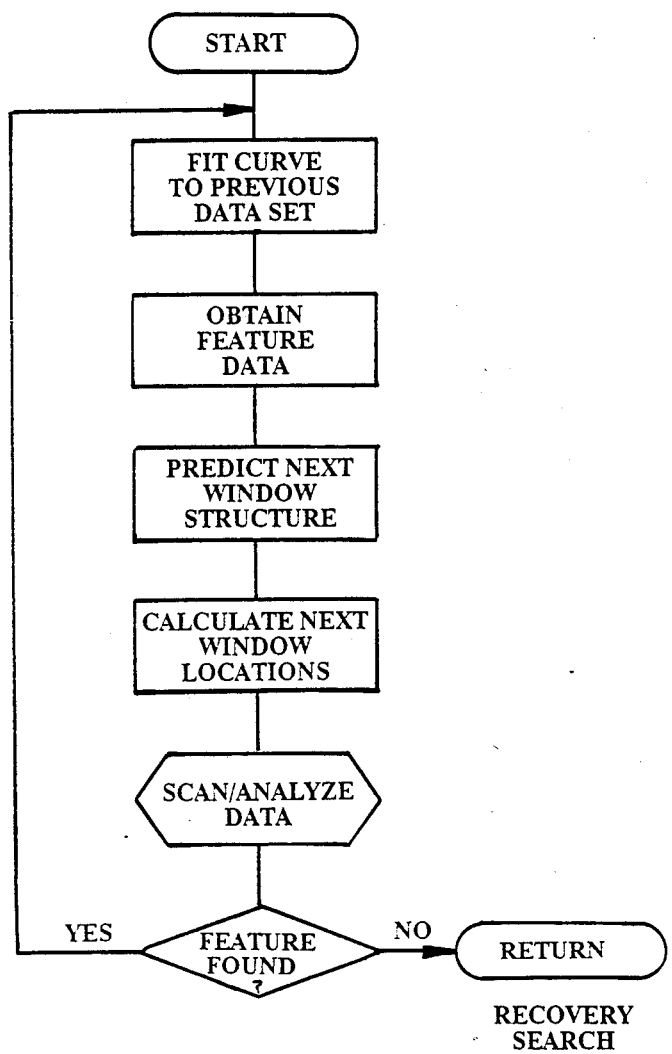
FIG. 19 is a flow chart similar to FIG. 17, but illustrating strating the tracking mode of the adaptive vision system.

FIG. 19 is a flow chart similar to FIG. 17, but illustrates the track mode of the system of the invention. In this mode, the computer fits a curve to the previous sets of data, i.e. it fits a curve to the feature locations of the previous scans. It obtains the feature data, which has been input in the initial search mode, and uses that data to predict the next scan window structure. This structure will include how wide the window is, how many points and the orientation and shape of the window. The system then determines where to put the predictive window by extrapolating from the curve which has been fitted to the previous data sets.

In this way, the system in the track mode takes the previous data sets, data regarding the nature of the feature and information relating to the platform position and future position, and structures a predictive window and places it at a logical predictive location. The system then proceeds to scan and analyze data.

If the feature is found, the system returns to the first block and loops through this function as long as the feature continues to be found in predictive windows. If and when the feature is not found, the system goes to the recovery search mode as indicated.

Figure 20:
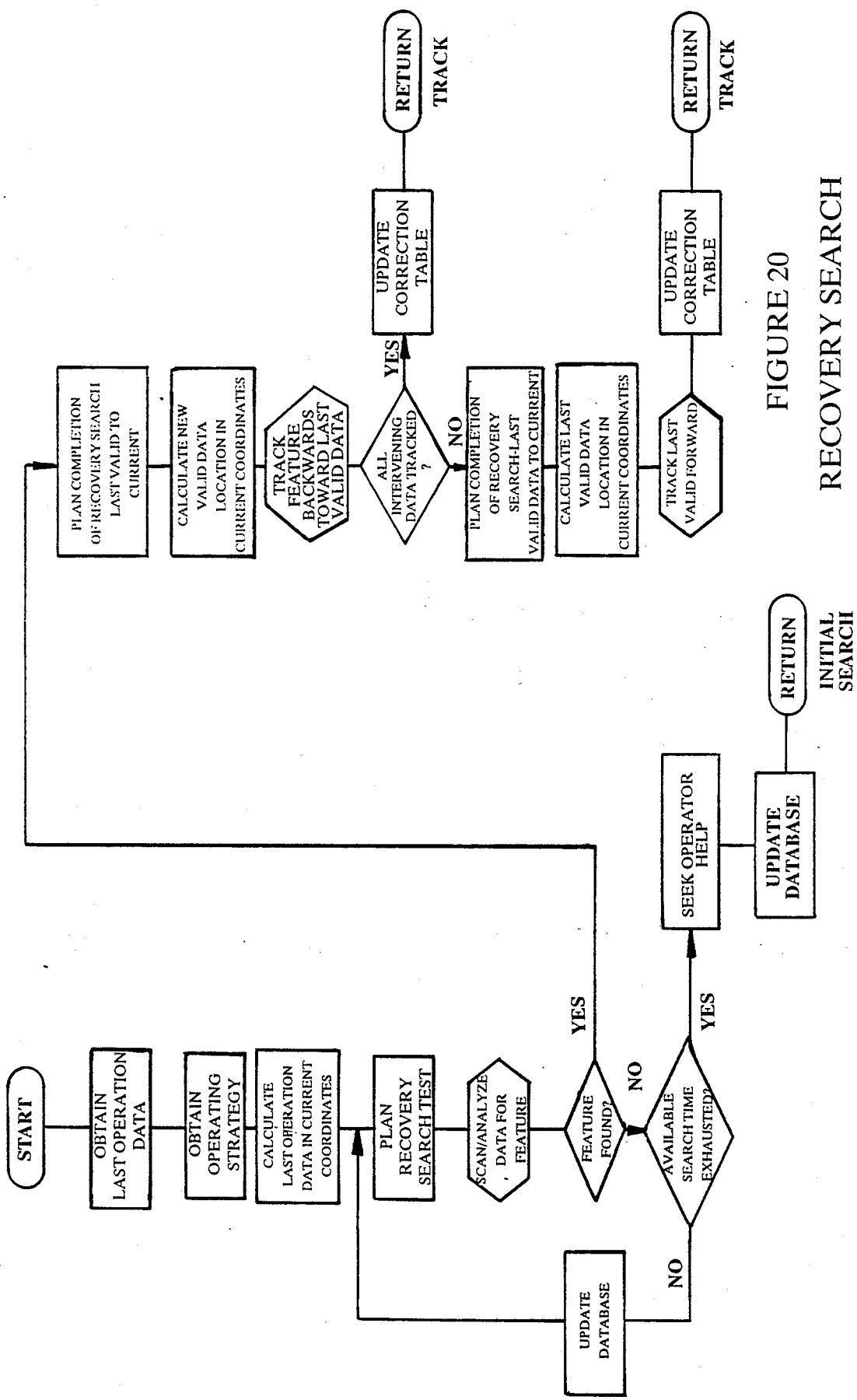
FIG. 20 is another flow chart similar to FIG. 17, but illustrating the recovery mode of operation of the adaptive vision system.

FIG. 20 is another flow chart diagram, illustrating the recovery mode of operation. As indicated, the system obtains the pertinent operation data which includes the last operating information, the operating strategy and the current platform coordinates. The system then plans the recovery search and carries out the recovery search by scanning and analyzing the data for the feature.

If the feature is not found, and the available search time is not exhausted then the data base is updated and the flow goes back to the planned recovery search box as shown in the figure. If the feature was not found and the available search time is exhausted then the operator's help is sought, the data base is updated and it returns the flow to the initial search routine.

If the feature is found as shown in the diagram the flow goes to the planned completion of recovery search. This procedure is used to complete the data between the last valid data point and the present recovered data point. The procedure is to walk backward from the currently found data point towards the initial last data point. This backward searching is carried out until all intervening data is either properly tracked or until the system can conclude that there was a permissible interruption, for example, a hole as described above with reference to FIG. 10. With all intervening data tracked, the correction table is updated and the system returns to the track mode.

If all intervening data has not been tracked, the system plans completion of the recovery search, by tracking from the last valid data found, forward to, for example, the interruption in the feature (if there is one). There may not be an interruption, but merely bad data during the first set of scans, and the system might determine that there is no interruption.

The system then calculates the last valid data location in current coordinates, and tracks the last valid data forward. The correction table is updated and the system returns to the track mode.

It should be understood that FIG. 20 represents one example of a procedure which might be found, under the control of the expert system included in the system of the invention.

Figure 21:
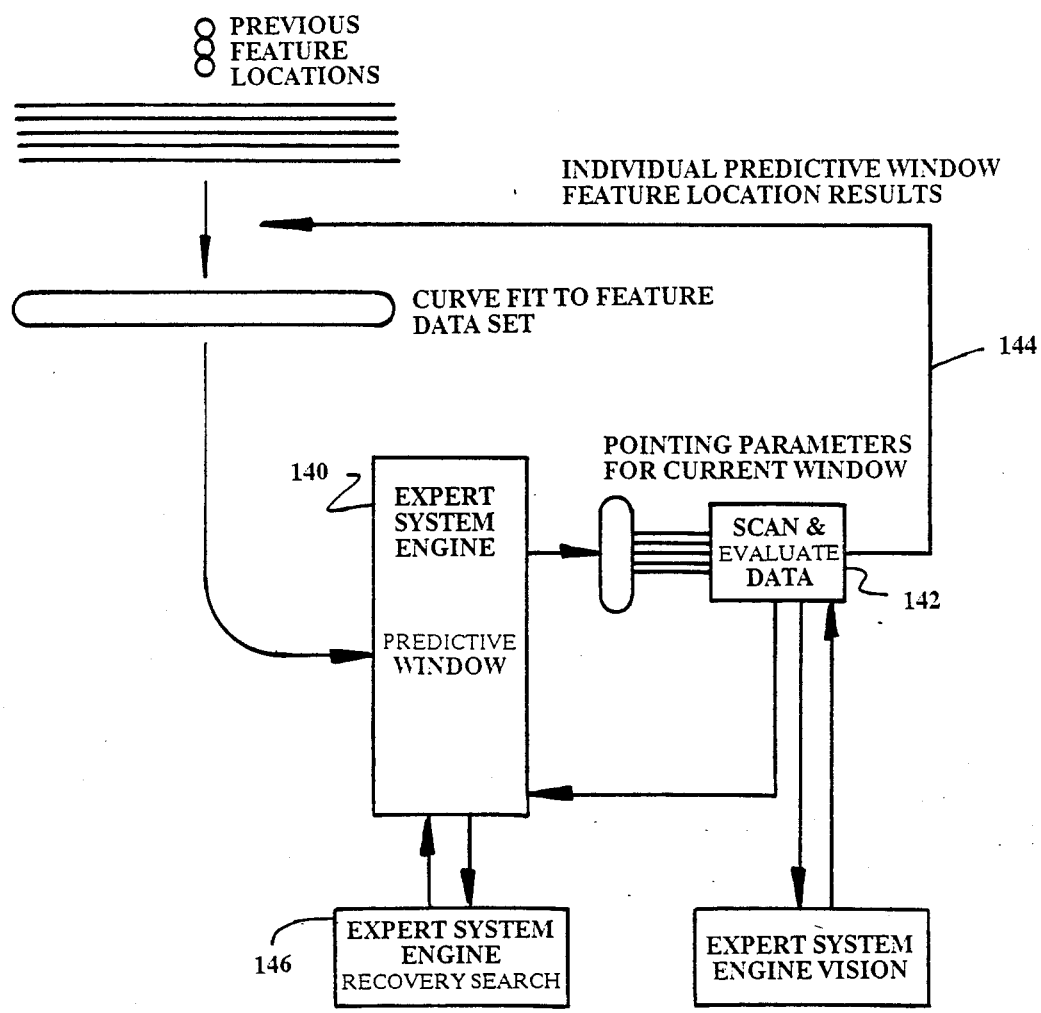
FIG. 21 is a system block diagram illustrating expert system control architecture, basically as contained in the vision system computer.

FIG. 21 is a system block diagram indicating the expert system control architecture. At the upper left of the drawing is indicated the data set representing previous feature locations. The diagram then shows the curve being fit to the data set from the previous feature locations, as explained above.

The block 140 entitled Expert System Engine represents software which makes decisions as to the structure of scans. Pointing parameters for the current window are sent to the right in the diagram, to a block 142 labeled scan and evaluate data. The received pointing parameters relate to the structure of the scan, while the software routine 142 fits the structured scan relative to the feature being tracked. Thus, the routine formulates instructions as to where to point the galvos, laser power level, and the digitization rate. In other words, the block 140 portion of the system takes the inputs as indicated and formulates what the structure of the scan should look like, and the routine 142 fits the scan structure to the position of the feature being tracked.

Upon evaluation of the data, block 142 communicates with the block 140 as to whether the feature was found within the scan window. The detailed results of the scan window evaluation are added to the data base, as indicated by the line 144.

The expert system engine indicated at the block 146 provides guidance for the block 140 to develop the next predictive window in the event the system is in the recovery search mode.

The above described preferred embodiments illustrate the principles of the invention, but are not intended to limit the scope of the invention. Other embodiments and variations to these preferred embodiments will be apparent to those skilled in the are and may be made without departing from the scope of the invention as defined in the following claims.

I claim:

1. A feature-tracking guidance system for a robotic system which includes a platform manipulated under central control of the robotic system, and with an end effector tool for performing a selected work function along a feature on a workpiece, comprising, means for moving the platform through a predetermined path under central control of the robotic system, with the path approximating the actual path taken by the feature on the workpiece, a vision system mounted on the platform ahead of the end effector, with scanning means for scanning a scanning pattern on the workpiece to identify and find the feature on the workpiece and with means for generating a signal representing the position of the feature on the workpiece for a subject location of the vision system, adaptive control means mechanically connecting the end effector tool to the platform, for controlling the position at which the end effector tool acts and for receiving the signal relating to the position of the feature and correcting or adjusting the end effector tool in real time subsequently to act correctly on the feature at said subject location where the signal was generated, so that the tool follows the feature even though the platform path, under central control, deviates from the feature.

2. The guidance system of claim 1, wherein the vision system comprises a 3D, structured light system.

3. The guidance system of claim I, wherein the vision system comprises an adaptive vision system including a 3D structured light system and a gray scale system, and computer means for operating the adaptive vision system to first track a feature by taking data points and using the structured light system, and if the feature is lost and cannot be recovered by structured light analysis, for re-analyzing the data points using the gray scale system to find contrast associated with the feature.

4. The guidance system of claim 3, wherein the vision system further comprises a topology system with means for taking data points on both sides of a probable location of the feature and for analyzing the data points to look for possible intersecting planes where the feature may lie, in the event the feature cannot be found by the structured light system or the gray scale system.

5. The guidance system of claim 1, including computer means associated with the vision system and the adaptive control means, for causing the adaptive control means to adjust the end effector tool to act on the feature at said subject location a preselected elapsed time period after the signal is generated, based on the speed of movement of the platform.

6. The guidance system of claim 1, wherein the vision system includes recovery search means for changing the scan pattern used when the tracked feature is lost, using several additional types of scan patterns to attempt to recover the feature.

7. The guidance system of claim 6, wherein the recovery search means includes adaptive means operable when the feature is lost for finding a feature path ahead of a last known point on the feature while the platform moves ahead at a constant rate based on known points still to be acted on by the end effector tool; and after the feature path is recovered, for taking less data to catch up to a normal operating mode wherein the vision system is a preselected interval ahead of the end effector tool, based on the distance between "null" or "normal" positions of the vision system and end effector and a preselected normal rate of travel of the platform.

8. The guidance system of claim 1, wherein the vision system includes means for determining the position of the feature by coordinates relative to the platform at the time the feature is detected, and wherein the adaptive control means includes means for receiving information from the central robotic system control as to the predetermined path of the platform following the time the feature is detected and for adjusting or transforming said coordinates by the increment of platform position change planned in accordance with the predetermined path between detection of the feature and the action of the end effector tool on the feature.

9. The guidance system of claim 1, wherein the vision system includes computer means with predictive means for predicting a path ahead of detected points on the feature by extrapolation based on recent history of the feature's path, and for opening predictive scan windows for scans just ahead based on a calculated probable feature location.

10. The guidance system of claim 9, wherein the predictiv means further includes means for predicting by extrapolation changes in the character of the feature ahead as might be incapable of detection by the vision system as presently operating, and wherein the vision system includes means for changing to a different scanning mode in response to such predicted changes in the character of the feature.

11. The guidance system of claim 1, wherein the predetermined path and the workpiece feature include portions which do not all lie in a single plane.

12. A component for a robotic system having a central control for controlling the movement of the robot system, said component comprising, a platform under central control of the robotic system, a vision system connected to the platform and having means for scanning a scanning path on a workpiece to determine the position of a feature on the workpiece as the platform advances generally along the feature, and with means for generating a signal representing the position of the feature on the workpiece for a given location of the vision system, adaptive stage means connected to the platform for moving with respect to the platform and including an end effector tool for performing a work function on the workpiece along said feature, generally not on the same path as the platform, and adaptive stage controller means including computer means, for receiving signals from the vision system representing the position of the feature and for accordingly adjusting the adaptive stage means and end effector tool relative to the platform in real time as the platform progresses to correctly perform the work function on the feature, thereby allowing single-pass operation under the central robotic control and avoiding reliance on long-distance repeatability of the robot under central control.

13. The component of claim 12, wherein the central control of the robotic system includes means for storing a predetermined path for the platform generally following the actual path of the feature on the workpiece, and for moving the platform in accordance with the predetermined path.

14. The component of claim 13, wherein the central control includes means for moving the platform at a preselected normal rate of travel on the predetermined path, and with the adaptive stage controller means including means for normally effecting adjustment of the adaptive stage and end effector tool a predetermined elapsed time interval after said signal is generated by the vision system, the time interval normally being the time taken by the platform to move the distance between "null" or "normal" positions of the end effector tool and of the vision system at said normal rate of travel.

15. The component of claim 12, wherein the adaptive stage controller means includes means for receiving signals from the central control relating to the path of the platform, and for adjusting the adaptive stage means and end effector tool based on position of the feature relative to the platform as determined by the vision system adjusted based on position change the platform will undergo on its path from the time the feature position is determined to the time the end effector tool performs the work function at that feature position, regardless of actual position of the platform relative to the workpiece at any given time.

16. A component for a robotic system having a central control for controlling the movement of the robot system, said component comprising, a platform under central control of the robotic system, with means associated with the central control for keeping a record of the position of the platform at a series of points along its path of movement, a vision system connected to the platform and having means for scanning a scanning pattern on a workpiece to determine the position of a feature on the workpiece as the platform advances generally along the feature, and with means for generating a signal representing the position of the feature on the workpiece for a given location of the platform, vision system computer means for controlling the vision system including the scanning means and for storing said signals relating to the location of the feature, and wherein the vision system signal generating means including means for generating a signal that a feature is not found in a particular scan when that is the case, and said vision system computer means including adaptive means for causing the scanning means to try any of several different scanning modes to recover the feature.

17. The robotic system component of claim 16, wherein the scanning means includes means for scanning wide and narrow scan patterns, patterns to left and right, patterns generally at the vision system, ahead of the vision system and behind the vision system as the platform advances and including oblique scan patterns, and wherein the adaptive means includes means for using in succession different such scanning patterns in a recovery mode until the feature is recovered.

18. The robotic system component of claim 17, wherein the adaptive means includes predictive means for predicting the probable position of the feature in the feature's path ahead of the platform, based on determined characteristics of the feature's path behind and at the platform, and for causing the scanning means, when scanning for the feature in said path ahead, to first try scanning a relatively narrow scan pattern or window based on a predicted probable position of the feature.

19. A component for a robotic system having a central control for controlling the movement of the robot system, said component comprising,
a platform under central control of the robotic system, with means associated with the central control for keeping a record of the position of the platform at a series of points along its path of movement,
a vision system connected to the platform and having means for scanning a scanning pattern on a workpiece to determine the position of a feature on the workpiece as the platform advances generally along the feature, and with means for generating a signal representing the position of the feature on the workpiece for a given location of the platform, and
vision system computer means for controlling the vision system including the scanning means and for storing said signals relating to the location of the feature, and
the vision system computer means including adaptive means with predictive means for predicting the probable position of the feature in the feature's path ahead of the platform, based on determined characteristics of the feature's path behind and at the platform, and for causing the scanning means, when scanning for the feature in said path ahead, to first try scanning a relatively narrow scan pattern or window based on a predicted probable position of the feature.

20. The robotic system component of claim 19, wherein the adaptive means includes means for causing the scanning means to scan for the feature in a wider pattern if the vision system does not find the feature in said relatively narrow scan pattern or window.

21. The robotic system component of claim 19, wherein the adaptive means includes means for predicting instances of the feature's becoming too narrow to be detected using a scanning mode currently being used, and for causing the scanning means to switch to a different mode with denser data points for portions of the feature where said instances are predicted.

22. A method of tracking a feature on a workpiece for a robotic system, the system including a platform manipulated under central control of the robotic system and an end effector tool supported by the platform for performing a selected work function along the tracked feature on the workpiece, the method comprising:
moving the platform through a predetermined path under central control of the robotic system, with the path approximating the actual path taken by the feature on the workpiece,
scanning a scan pattern on the workpiece with a computer-controlled vision system mounted on the platform to identify and find the feature on the workpiece and to generate a signal representing the position of the feature on the workpiece for that location of the vision system relative to the location of the platform,
receiving the signal representing the position of the feature on the workpiece by an adaptive control system which controls in real time the end effector tool mounted on the platform,
controlling the position at which the end effector tool acts, in real time as the platform progresses, by correcting or adjusting the end effector tool subsequently to act correctly on the feature at said location where the signal was generated, with the end effector tool following a path different from that of the platform.

23. The method of claim 22, including the step of performing an initial search for the feature with the vision system in order to locate the feature before the end effector tool is engaged to act on the workpiece.

24. The method of claim 22, wherein the scanning is performed by a vision system capable of generating 3-D ;structured light information, topology, and gray scale information concerning the scanned surface.

25. The method of claim 24, including analyzing data points collected while scanning with the structured light vision system to obtain 3-D information about the workpiece surface, and if the feature is lost and cannot be relocated, re-analyzing the data points to obtain gray scale information about the workpiece surface in order to relocate the feature.

26. The method of claim 25, including re-analyzing the the data points collected while scanning to obtain topology information about the workpiece surface to look for possible intersecting planes where the feature being tracked may lie, in the event that the feature cannot be found by using either 3-D or gray scale information.

27. The method of claim 24, including the steps of predicting with the vision system the probable characteristics of the feature's path ahead of the platform, based on characteristics of the feature determined by prior scans, and analyzing the scan data to obtain the type of information, either 3; -D, topology or gray scale, which is most likely to identify and locate the feature.

28. The method of claim 24, including the step of performing a recovery search with the vision system when the feature is lost, by modifying the scanning pattern and analyzing the data to obtain each of the possible type of information about the scanned surface until the feature is located or until all such analysis is done without locating the feature.

29. The method of claim 22, wherein the step of adjusting the end effector tool involves timing the adjustment to occur a predetermined elapsed time after the signal for the subject position is generated.

30. The method of claim 22, wherein the scanning is done in wide and narrow scan paths, paths to the left and right, paths generally at the vision system, ahead of the vision system and behind the vision system as the platform advances, and including use in succession of different such such scanning paths in a recovery mode until the feature is recovered.

31. The method of claim 30, including the steps of predicting with the vision system and a vision system computer the probable position of the feature in the feature's path ahead of the platform, based on determined characteristics of the feature's path behind and at the platform, and scanning in a relatively narrow predictive scan path or window based on a predicted probable position of the feature.

32. The method of claim 22, including the step of setting the predetermined path of the platform with a lead through teach wherein an operator causes the platform to move generally along the feature's path, keeping the feature within the field of view of the vision system, and the operator also causing the platform to record its coordinates from time to time, the liens between such coordinates being the predetermined path.

33. The method of claim 22, including manually inputting the characteristics of the feature to be tracked to a computer of the vision system.

34. The method of claim 22, including the steps of predicting with the vision system when the feature's path will go beyond the field of view of the vision system if the platform stays on the predetermined path, and sending path correction instruction from the vision system to the central control of the robotic system so that the platform path can be corrected to prevent the feature from leaving the vision system's field of view as the platform moves.

35. The method of claim 22, wherein the step of adjusting the end effector tool to control its position includes using the position of the feature relative to the current position of the platform as the feature is detected, as well as information regarding the predetermined path forward of such current position and the speed of the platform's movement and a preselected elapsed time period form detection of the feature, to automatically circulate and control the end effector tool to act correctly on the feature, said preselected elapsed time period after detection of the feature.

36. A method of adaptively tracking a feature on a workpiece, for a robotic system having a platform which is movable under central control of the robotic system, comprising the steps of:
moving the platform along a predetermined path with the central control of the robotic system, the path approximating the actual path f the feature on the workpiece which is being tracked,
repeatedly scanning a scan pattern on the workpiece with a vision system mounted on the platform to identify and find the feature on the workpiece,
generating with the vision system a signal representing the position of the feature on the workpiece with respect to the position of the platform at the time of the scan, and
adaptively varying the position and number of data points of each scan and the frequency of scans with a computerized vision control system based on characteristics of the feature's path determined from prior scans, such that the feature is located with a minimum amount of data and processing time.

37. The method of claim 36, including the step of performing an initial search for the feature with the vision system to locate the feature.

38. The method of claim 36 wherein the scanning is performed by a vision system capable of generating 3-D structured light, topology, and gray scale information concerning the scanned surface.

39. The method of claim 38, including analyzing the data points collected while scanning with the structured light vision system to obtain 3-D information about the workpiece surface, and if the feature is lost and cannot be relovated, re-analyzing the data points to obtain gray scale information about the workpiece surface in order to relocate the feature.

40. The method of claim 39, including re-analyzing the data points collected while scanning to obtain topology information about the workpiece surface to look for possible intersecting planes where the feature being tracked may lie, in the event that the feature cannot be found by using either 3-D or gray scale information.

41. The method of claim 36, including the step of performing a recovery search with the vision system when the feature is lost, by modifying the scanning pattern and analyzing the data to obtain different types of information about the scanned surface until the feature is located or until all such analysis is conducted without locating the feature.

42. The method of claim 41, including the step of generating a fail signal for the operator when the vision system cannot relocate the feature after the recovery search.

43. A method of adaptively tracking a feature on a workpiece, for a robotic system having a platform which is movable under central control of the robotic system, comprising the steps of:
moving the platform under direction of the central control of the robotic system, without following any pre-set overall path and without intervantion of a human operator,
repeatedly scanning scan patterns on the workpiece with a computerized vision system mounted on the platform to identify and find the feature on the workpiece as the platform progresses,
generating with the vision system a signal representing the position of the feature on the workpiece with respect to the position of the platform at the time of each scan,
feeding the signal back to the robotic system central control and accordingly adjusting automatically the direction of movement of the platform by the central control in "real time," and
recording the actual path of the feature as determined by a series of points on the feature detected by the vision system.

44. The method of claim 43 further including adaptively varying the position and number of data points of each scan and the frequency of scans with the computerized vision system based on characteriustics of the feature's path determined from prior scans, such that the feature is located with a minimum amount of data processing time.

* * * * *

UNITED STATES PATENT AND TRADEMARK OFFICE
CERTIFICATE OF CORRECTION

PATENT NO. : 4,907,169
DATED : March 6, 1990
INVENTOR(S) : Paul A. Lovoi

It is certified that error appears in the above—identified patent and that said Letters Patent is hereby corrected as shown below:

Column 23, line 44, "predictiv" should read --predictive--.

Column 26, line 48, "3; -D" should be --3-D--.

Column 26, line 55, "type" should read --types--.

Column 27, line 15, "liens" should be --lines--.

Column 27, line 38, "circulate" should be --calculate--.

Column 28, line 12, "relovated" should be --relocated--.

Column 28, line 38, "intervantion" should be --intervention--.

Signed and Sealed this

Sixteenth Day of April, 1991

*Attest:*

HARRY F. MANBECK, JR.

*Attesting Officer*  *Commissioner of Patents and Trademarks*